(12) United States Patent
Waller et al.

(10) Patent No.: US 8,011,289 B2
(45) Date of Patent: Sep. 6, 2011

(54) HALF-SLEEVED AND SLEEVELESS PLASTIC PISTON PUMPS

(75) Inventors: Brian F. Waller, West Carrollton, OH (US); Bruce Allen Bryson, Arcanum, OH (US)

(73) Assignee: BWI Company Limited S.A., Luxembourg (LU)

( * ) Notice: Subject to any disclaimer, the term of this patent is extended or adjusted under 35 U.S.C. 154(b) by 1028 days.

(21) Appl. No.: 11/895,551

(22) Filed: Aug. 24, 2007

(65) Prior Publication Data

US 2007/0289442 A1 Dec. 20, 2007

Related U.S. Application Data

(63) Continuation-in-part of application No. 11/623,077, filed on Jan. 13, 2007, now Pat. No. 7,823,982.

(51) Int. Cl.
*F16J 9/08* (2006.01)

(52) U.S. Cl. .................................................. 92/242

(58) Field of Classification Search .................. 92/242
See application file for complete search history.

(56) References Cited

U.S. PATENT DOCUMENTS

| 5,618,169 A * | 4/1997 | Smith ......................... 92/242 |
| 6,457,956 B1 * | 10/2002 | Hauser et al. ................ 417/470 |

\* cited by examiner

*Primary Examiner* — Daniel Lopez
(74) *Attorney, Agent, or Firm* — Dickinson Wright PLLC

(57) ABSTRACT

In one aspect, a brake pump assembly with a hydraulic block and a pumping element including a polymer piston that is received in a piston bore. A circumference of the polymer piston defines a high-pressure seal slideably engaging adjacent structure. The polymer piston may include a peripheral sealing lip projecting primarily longitudinally from the polymer piston for sealing engagement with the piston bore. In another aspect, a brake pump assembly with a hydraulic block, a straight bore polymer piston, a peripheral sealing lip projecting from a proximal portion of the polymer piston, and a elastomeric seal mounted to a distal portion of the polymer piston, where the peripheral sealing lip selectively acts to depressurize fluid accumulating between the peripheral sealing lip and elastomeric seal.

11 Claims, 17 Drawing Sheets

HALF-SLEEVED AND SLEEVELESS PLASTIC PISTON PUMPS

CROSS-REFERENCE TO RELATED APPLICATIONS

This application is a continuation-in-part of U.S. patent application Ser. No. 11/623,077, filed on Jan. 13, 2007, now U.S. Pat. No. 7,823,982 the entirety of which is incorporated herein by reference.

BACKGROUND

The disclosure is directed to hydraulic piston pump elements for use in a brake pump assembly and, more particularly, to a stepped bore configuration, or may be a straight bore configuration, or may be either configuration piston pump elements. In brake systems which utilize anti-lock brake systems ("ABS"), traction control systems ("TCS"), electronic stability control systems ("ESC"), and/or other controlled braking systems to generate controlled braking events, it may be desired to modulate pressure inside the brake system with a brake pump assembly to enable controlled braking events.

Brake pump assembly suppliers are continually challenged to provide next-generation brake pump assemblies at a lower unit cost while maintaining or increasing performance and durability standards. Brake pump assembly designs have focused on a wide variety of strategies to accomplish the lower unit cost objective, including but not limited to a simplified assembly sequence strategy, a reduced number of components strategy, etc. Multiple assembly variations typically add time and expense to the assembly sequence. However, eliminating components by combining functions in a multiple assembly configuration may offset such disadvantages and provide another useful strategy for achieving a lower unit cost objective.

Accordingly there is a need for a brake pump assembly having a lower unit cost which meets or exceeds the performance and durability standards of currently produced brake pump assemblies.

SUMMARY

Brake pump assemblies produced in accordance with certain aspects of the disclosure provide lower unit costs without significantly detracting from performance and durability standards.

In one aspect, the disclosure relates to a brake pump assembly with a hydraulic block and a pumping element including a polymer piston that is received in a piston bore. A circumference of the polymer piston defines a high-pressure seal slideably engaging adjacent structure. The pumping element may include a half-sleeve, where the high-pressure seal is an interface surface between a proximal portion of the polymer piston and the half-sleeve, or the high-pressure seal may be an interface surface between a proximal portion of the polymer piston and the piston bore. The polymer piston may include a peripheral sealing lip projecting primarily longitudinally from the polymer piston for sealing engagement with the piston bore.

In another aspect, the disclosure relates to a brake pump assembly with a hydraulic block, a generally cylindrical polymer piston slideably and sealingly engaging a piston bore, and a pump bore cap, where the elements define a sleeveless fluid pumping element in a motor vehicle brake pump assembly. The polymer piston may include a unitary and integral peripheral sealing lip projecting primarily longitudinally from the polymer piston to define a directional pressure seal with the piston bore.

In another aspect, the disclosure relates to a brake pump assembly with a hydraulic block, a straight bore polymer piston, a peripheral sealing lip projecting from a proximal portion of the polymer piston, and a elastomeric seal mounted to a distal portion of the polymer piston, where the peripheral sealing lip selectively acts to depressurize fluid accumulating between the peripheral sealing lip and elastomeric seal.

DETAILED DESCRIPTION

Figure 1:
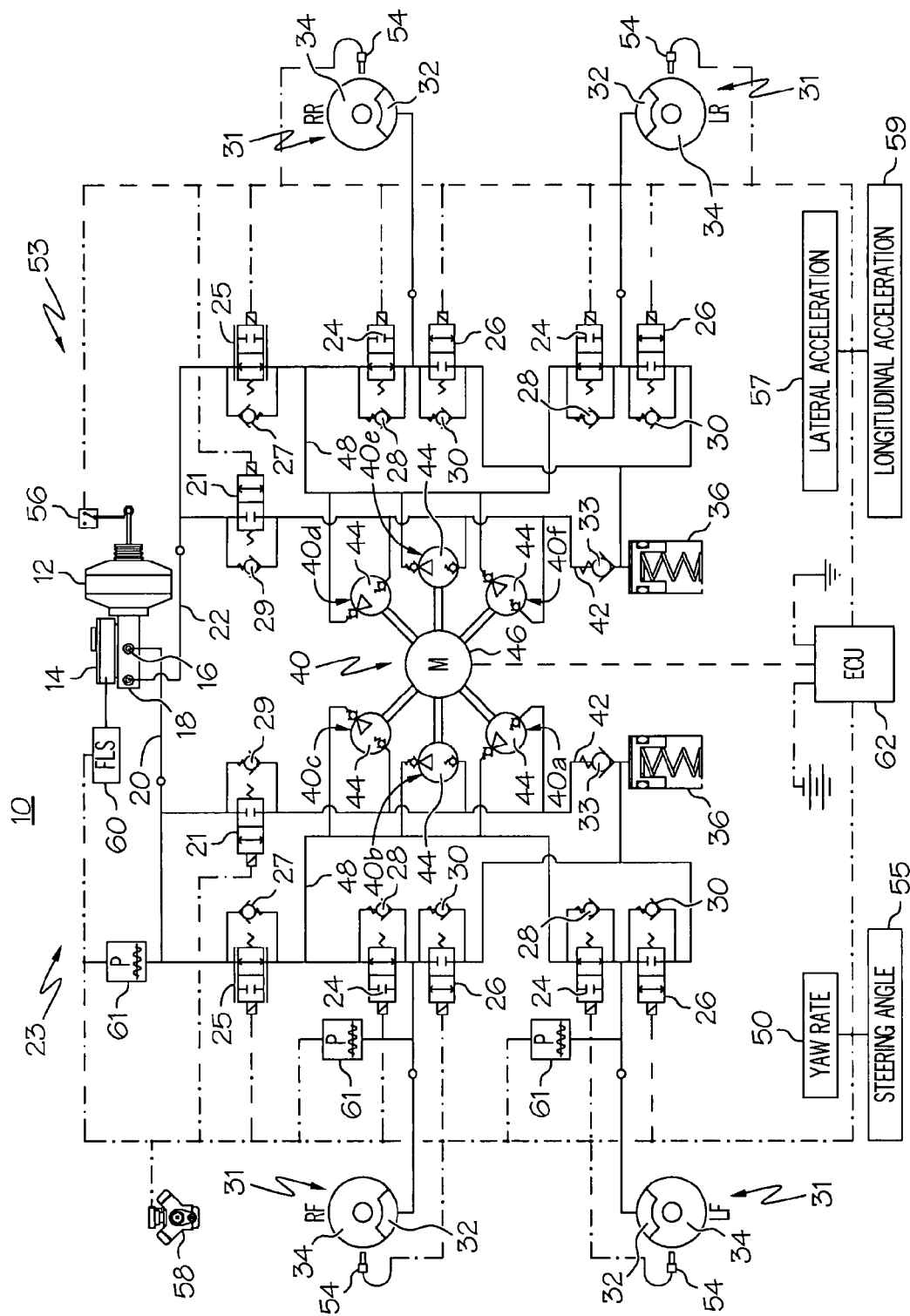
FIG. 1 is a schematic diagram of a vehicular brake system according to aspects of this disclosure.

As shown in FIG. 1, a basic motor vehicle brake system, generally designated 10, includes a master cylinder 12 having a reservoir 14, wherein the master cylinder 12 is operatively coupled to a brake pedal (not shown). The master cylinder 12 is configured such that when the driver presses the brake pedal brake fluid in the master cylinder 12 is pressurized and delivered to a pair of ports 16, 18, with a primary brake line 20 coupled to and extending from the port 16 and a secondary brake line 22 coupled to and extending from the other port 18. A front brake subsystem, generally designated 23, may be coupled to the primary brake line 20 and include a pair of normally open apply valves 24 and a pair of normally closed release valves 26. The subsystem further includes a pair of apply check valves 28, with each apply check valve 28 being in parallel with the associated apply valve 24, and a pair of release check valves 30, with each release check valve 30 being in parallel with the associated release valve 26.

Fluid passing through each apply valve 24 flows to an associated wheel brake subsystem, generally designated 31, for braking either the right front ("RF") or left front ("LF") wheel, or the right rear ("RR") or left rear ("LR") wheel, as further described below. The pressurized fluid causes a caliper 32 in the wheel brake subsystem 31 to compress and thereby cause a brake pad or pads to engage a rotor 34 to brake the associated wheel in a well-known manner.

The outlets of the release valves 26 are in fluid communication with an accumulator 36 such that fluid is collected in the accumulator 36 as it is released from the wheel brake subsystems 31. The accumulator 36 is in fluid communication with a pump, generally designated 40, via a pump inlet line 42. The pump assembly 40 may include six pumping elements 40a, 40b, 40c, 40d, 40e, and 40f, three of which 40a, 40b, and 40c may serve the front brake subsystem 23. A motor 46 is operatively coupled to each pumping element 40a, 40b, 40c, 40d, 40e, and 40f to reciprocally drive the elements. When the pump assembly 40 is operating, fluid exits the pumping elements 40a, 40b, and 40c via an associated pump outlet line 48 and is delivered to a location upstream of the apply valves 24.

A rear brake subsystem, generally designated 53, may be coupled to the secondary brake line 22 and may operate in a manner similar to that described above, but with fluid exiting the pumping elements 40d, 40e, and 40f. In this manner two separated, isolated hydraulic systems or brake circuits provide a front/rear split for brake redundancy in a well-known manner. However various other splits including diagonal splits and the like may be provided.

The brake system 10 may further include a pair of normally closed prime valves 21 and a pair of normally open isolation valves 25. Each prime valve 21 is coupled to the associated brake line 20, 22 such that fluid can flow from the master cylinder 12 to the pump assembly 40 via the associated pump inlet line 42. Each isolation valve 25 is coupled to the associated brake line 20, 22 to allow or block the flow of fluid between the master cylinder 12 and the associated apply valves 24 and wheel brake subsystems 31.

The brake system 10 may also further include a pair of isolation check valves 27, with each isolation check valve 27 being in parallel with the associated isolation valve 25; a pair of prime check valves 29, with each prime check valve 29 being in parallel with the associated prime valve 21; and a pair of pump accumulator check valves 33, with each pump accumulator check valve 33 being disposed between one of the accumulators 36 and the input of the associated pumping elements 40a, 40b, and 40c or 40d, 40e, and 40f.

The brake system 10 may additionally include a plurality of sensors to monitor the status of the vehicle. In particular, the brake system 10 may include wheel speed sensors 54, a brake pedal position sensor 56, and a fluid level sensor 60 to measure fluid levels in the reservoir 14. The system may further include a yaw rate sensor 50, a steering wheel angle sensor 55, a lateral acceleration sensor 57, a longitudinal acceleration sensor 59, and pressure sensors 61. Each of the sensors 50, 54, 55, 56, 57, 58, 59, 60, 61 may be operatively coupled to an electronic control unit or "ECU" 62 which can receive and/or process inputs from the various sensors. The ECU 62 may also be operatively coupled to each of the apply 24 and release 26 valves, the pump motor 46, the prime valves 21, the isolation valves 25, and the engine throttle 58 to control and monitor these components.

The system 10 illustrated in FIG. 1 provides electronic stability control ("ESC"), which may also be referred to as vehicle stability enhancement ("VSE") or an electronic stability program ("ESP"). ESC is an electromechanical control system designed to monitor and influence wheel dynamics, and ultimately vehicle dynamics, during a vehicle state of braking, steering, accelerating, or coasting. ESC typically uses input from wheel speed sensors 54, steering wheel angle sensor 55, yaw rate sensor 50, lateral acceleration sensor 57, and, optionally, longitudinal acceleration sensor 59 to determine both the driver's intended heading and the vehicle's actual heading. ESC typically controls the application of a wheel brake subsystem 31 on a single wheel or two wheels simultaneously, as necessary, to help a driver regain control in a skid caused by oversteering or understeering in a curve, but also may also operate to provide control and vehicle guidance in various other manners.

During a controlled braking event (whether triggered by ABS, TCS, ESC, or the like), the ECU 62 operates the pump assembly 40 and the apply 24 and release 26 valves to control the brake pressure applied to the wheel brake subsystems 31 in a well-known manner. It should be understood that the brake schematic shown in FIG. 1 is provided as merely an example of a single type of brake system in which the pump assembly 40/pumping elements 40a, 40b, 40c, 40d, 40e, and 40f may be employed.

For example, during ABS control the apply 24 and release 26 valves are operated to control the brake pressure applied to the wheel brake subsystems 31 so that the applied pressure matches, as closely as possible, the pressure requested by the driver while regulating wheel slip to provide the maximum brake torque available for a tire/road interface. Thus the apply 24 and release 26 valves, as well as the pump assembly 40, can be operated by the ECU 62 to control braking pressure in the well-known manner of ABS control.

For further example, during TCS control it is generally desired to apply brake pressure to an excessively spinning wheel to cause torque to transfer to the other wheel on the same axle in a well-known manner. This type of pressure build mode requires brake fluid to flow from the master cylinder 12 to the appropriate apply valves 24 and associated wheel brake subsystems 31 without any user input. Thus the apply 24 and release 26 valves, pump assembly 40, prime valves 21, and isolation valves 25 can be operated by the ECU 62 to control braking pressure in the well-known manner of TCS control. Of course any of a variety of vehicle brake systems may be utilized to implement ABS, TCS, and/or ESC, and FIG. 1 is merely illustrative of one such system.

Figure 2:
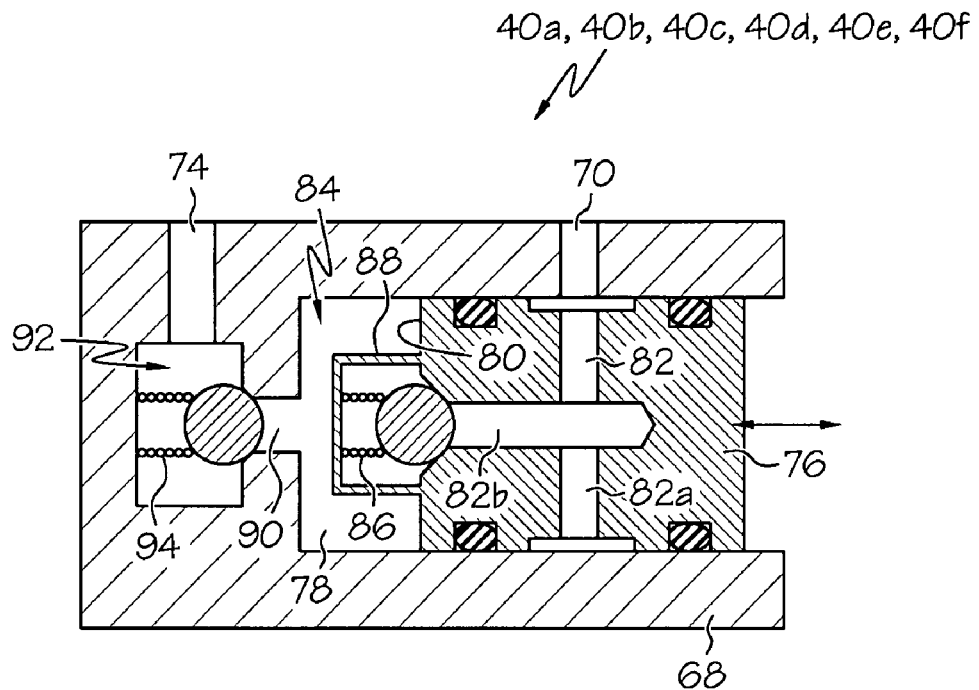
FIG. 2 is a cross-section view of one aspect of a disclosed pumping element in the form of a straight bore configuration.

FIG. 2 illustrates one aspect of a pumping element 40a-f in the form of a straight bore configuration. In particular, the pumping element 40a-f includes an outer sleeve 68 having an inlet 70 coupled to the pump inlet line 42 and an outlet 74 coupled to the pump outlet line 48. A piston 76 is slidably yet sealingly received within the outer sleeve 68. A filter (not shown) may be provided at the inlet 70. The piston 76 defines a generally sealed primary pump cavity 78 located between the leading surface 80 of the piston 76 and the outer sleeve 68.

The piston 76 includes a central bore 82 including a generally radially-extending portion 82a communicating with the inlet 70 and a generally axially extending portion 82b leading to the leading surface 80 of the piston 76. An inlet check valve, generally designated 84, which may be in the form of a ball valve, seats adjacent to the axially extending portion 82b of the central bore 82. The inlet check valve 84 is spring biased into the closed position by a spring 86 located between a retainer 88 and the piston 76. The pumping element 40a-f further includes a throat 90 located adjacent to the primary pump cavity 78. An outlet check valve, generally designated 92, which may be in the form of a ball valve, seats against the throat 90. The outlet check valve 92 is spring biased into a closed position by an outlet check valve spring 94.

During operation of the pumping element 40a-f the piston 76 may commence pumping operations when the piston 76 is in a top dead center position (i.e., moved fully to the left in FIG. 2). As the piston 76 moves through a suction stroke (i.e., moves to the right) the size of the primary pump cavity 78 increases, thereby creating a relative suction and drawing fluid in through the inlet 70 and into the central bore 82 of the piston 76. The pressure differential between the primary pump cavity 78 and the central bore 82 causes the inlet check valve 84 to open (i.e., the inlet check valve ball moves to the left from the position shown in FIG. 2) to allow fluid to flow into the primary pump cavity 78.

Once the piston 76 has moved to a bottom dead center position (i.e., moved fully to the right in FIG. 2) the piston 76 begins to move through a discharge stoke (i.e., moves to the left). This discharge stroke compresses the fluid in the primary pump cavity 78 and creates an increased pressure therein. The increased pressure opens the outlet check valve 92 (i.e., the outlet check valve ball moves to the left from the position shown in FIG. 2) and pushes pressurized fluid through the throat 90 and to the outlet 74 for use in the brake system 10. The piston 76 may continue to reciprocate in this manner to provide pressurized brake fluid to the brake system 10 as needed.

Figure 3:
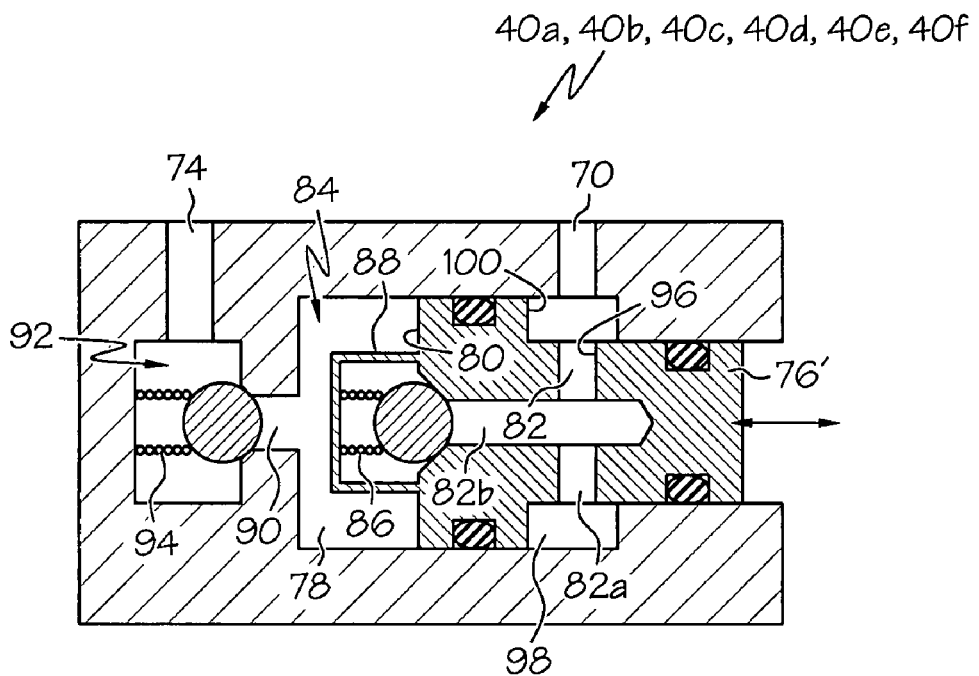
FIG. 3 is a cross-section view of an another aspect of a disclosed pumping element in the form of a stepped-bore configuration.

FIG. 3 illustrates another aspect of a pumping element 40a-f in the form of a stepped bore configuration. Piston 76' is similar to piston 76, but includes a relatively narrow trailing neck portion 96 such that a secondary pump cavity 98 is located between the radially-extending bore portion 82a of the piston 76' and the outer sleeve 68. The piston 76' may be shaped to provide a 2:1 ratio such that the surface area on the leading surface 80 of the piston head is about double the surface area on the opposite, stepped side 100 of the piston head. The secondary pump cavity 98 operates in an offset manner as compared to the primary pump cavity 78. In particular, as the piston 76' of FIG. 3 moves from the top dead center position to the bottom dead center position (i.e., moves left-to-right in FIG. 3) the primary pump cavity 78 grows larger and creates a suction force. Simultaneously the secondary pump cavity 98 grows smaller and creates a temporary positive pressure at the inlet 70 of the pumping element 40a-f which improves the probability of fluid flowing through the inlet check valve 84 and into the expanding primary pump cavity 78. In this manner the secondary pump cavity 98 essentially "primes" the primary pump cavity 78 to ensure that, during the discharge stroke, the pumping element 40a-f displaces an increased amount of fluid and thus operates with overall greater efficiency.

When the piston 76' moves from the bottom dead center position to the top dead center position (i.e., moves right-to-left in FIG. 3) the primary pump cavity 78 grows smaller and pushes pressurized fluid through the outlet check valve 92 and outlet 74. Simultaneously, the secondary pump cavity 98 grows larger and thereby draws fluid in via the inlet 70. The stepped bore pumping element 40a-f of FIG. 3 is sometimes termed a "two-stage" pump due to the dual stage pumping action. However, it is noted that this design is not necessarily a pure two-stage pump, and may instead be more properly classified as a modified single-stage pump or a stepped-bore pump.

Figure 4:
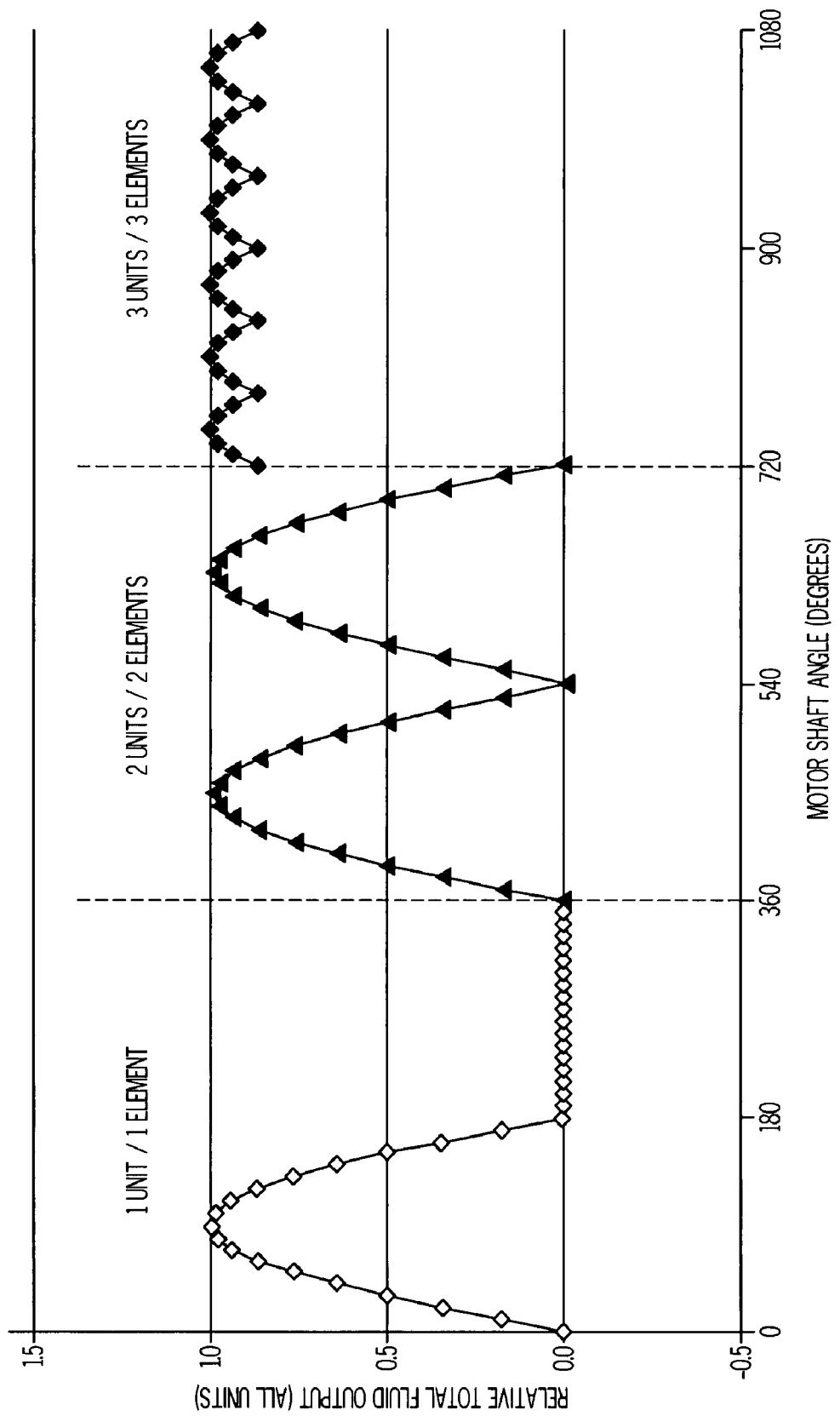
FIG. 4 is a graph of brake fluid output as a function of instantaneous pump motor shaft angle for a horizontally opposed configuration, showing the output of three assemblies over three differently labeled cycles.

Considering either the front 23 or rear 53 hydraulic circuit separately, FIG. 4 illustrates the theoretical pump output flow rates for a one pumping element (providing one pumping cycle per shaft revolution), two pumping element (providing two pumping cycles per shaft revolution, and operatively spaced 180° apart), and three pumping element (providing three pumping cycles per shaft revolution, and operatively spaced 120° apart) assembly based upon the instantaneous rate of shaft displacement. Operatively spaced apart, as used herein, means that the pistons of the relevant pumping elements will be at a bottom dead center position at different points in a shaft revolution (e.g., 0° and 180°, or 0° and 120° and 240° for the scenarios described above).

For a single pumping element, illustrated as the curve at far left of FIG. 4, the bottom dead center position corresponds to 0° (and 360°). The fluid output flow is delivered in less than one-half revolution of the pump motor shaft with a corresponding significant rise in line pressure due to the rapid change in flow as the pumping element changes from no flow to full flow and back to no flow for each discharge stroke. In a controlled brake application this makes the brake pedal feel harsh and also contributes to excess vibration and noise. Two pumping elements operatively spaced 180° apart, illustrated as the middle curve of FIG. 4, provide up to twice the total flow rate. However the flow rate profiles and resulting pressure pulses still produce unacceptable "NHV" performance (noise, harshness, and vibration performance) for the brake user even with the combined pumping elements as the instantaneous flow can still vary from zero to full flow. Three pumping elements operatively spaced 120° apart, illustrated as the curve at far right of FIG. 4, provide up to three times the total flow rate. Moreover since the output flows of the pumping elements now overlap, the total instantaneous flow becomes much more constant and never approaches zero. The number of pulses is doubled from the overlapping output flows, and the total flow rate remains much more constant with the magnitude of the pulses being significantly reduced. As a result NHV performance is much improved.

From the type of analysis demonstrated above, it is believed that an even number of pumping elements (e.g., 2, 4, etc) would not generate the out-of-phase flow discharges and the desirable improvements in NHV performance. It is also believed that a higher number of pumping units (e.g., 5, 7, etc.) operating with an appropriate angular separation could show marginal improvement in NHV performance, however it is believed that providing more than three pumping elements would not be economically justified.

Typically, brake systems including fewer pumping elements (i.e., the single element and two element scenarios discussed earlier in the context of FIG. 4) incorporate a damping chamber onto the pump outlet line 48 consisting of a compliant member and a damper orifice in order to dampen the fluid flow and reduce pressure fluctuations. However for the brake systems illustrated in FIGS. 5 and 6 the amplitude of pressure pulsations of fluid being returned to the primary brake line 20 is small when utilizing a 120° operative spacing in pumping element operation, and the damping chamber component may be eliminated from the design thereby providing a cost savings.

Figure 6:
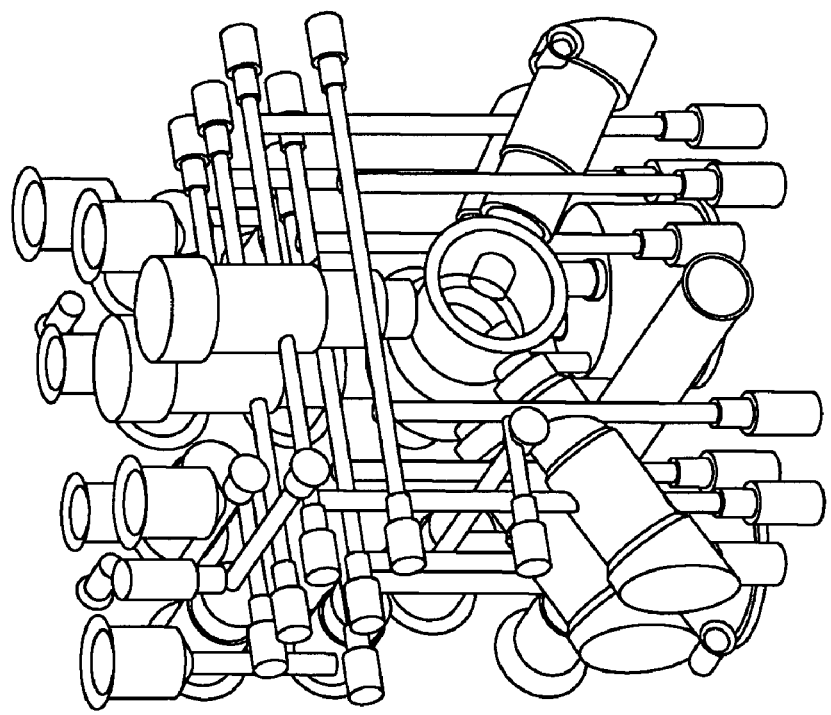
FIG. 6 is a cut-away front perspective view of a radial-style hydraulic block configuration.
Figure 5:
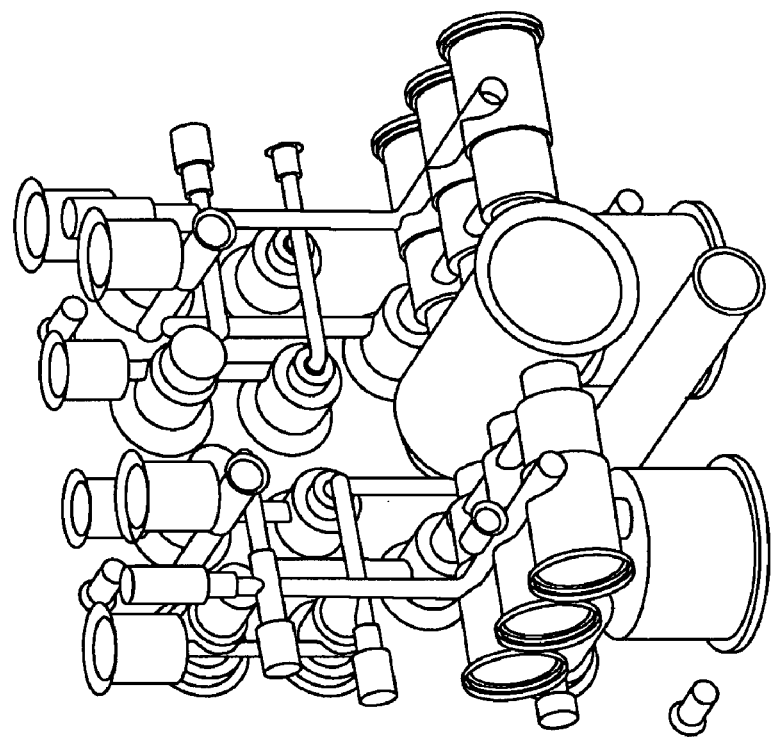
FIG. 5 is a cut-away front perspective view of a horizontally opposed hydraulic block configuration according to aspects of the disclosure.
Figure 7:
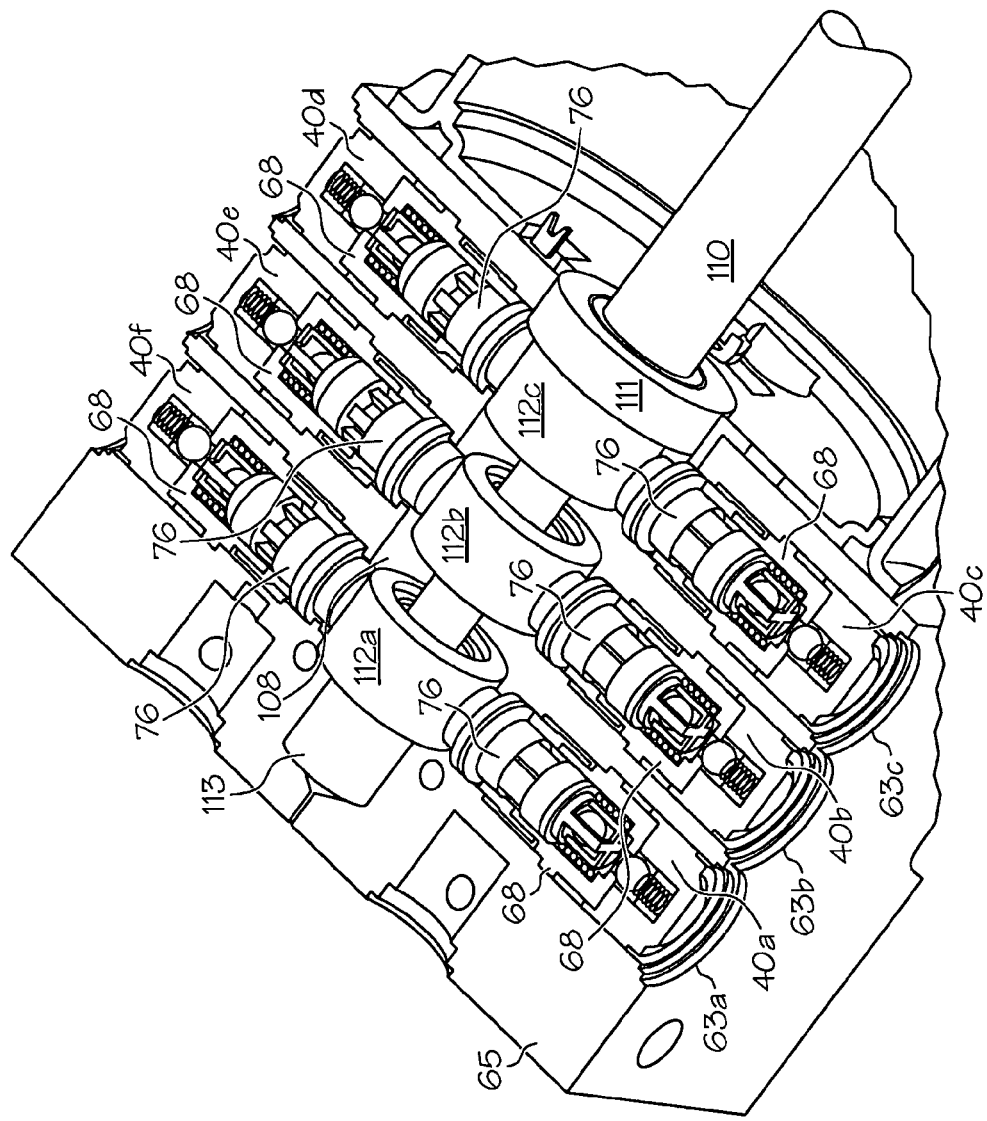
FIG. 7 is a cross-section perspective view of one aspect of a brake pump assembly having the hydraulic block configuration shown in FIG. 5 and including six pumping elements driven by a rotatable eccentric assembly.

The horizontally opposed (i.e., boxer-style) hydraulic block shown in FIG. 5 is believed to be much less expensive to manufacture as compared to the radial-style hydraulic block shown in FIG. 6. The boxer-style arrangement utilizes a much simplified machining and assembly sequence that reduces the number of interconnecting piston bores (i.e., the bores 63a, 63b, 63c that house the pumping elements 40a-f, as shown in FIG. 7) required through the modulator body or hydraulic block. A brake system incorporating six stepped bore piston pump elements in a boxer-style arrangement also allows all orthogonal drilling and assembly, which further reduces cost by minimizing the number of mounting fixtures required for both machining and assembly. The boxer-style, six pump layout shown in FIG. 5 requires three interconnecting bores that may be orthogonally drilled through the hydraulic block. The radial-style, six pump layout as shown in FIG. 6 requires six bores that are not axially aligned and therefore not orthogonally drillable.

In one aspect of the disclosure, shown in FIG. 7, six pumping elements 40a, 40b, 40c, 40d, 40e, and 40f may be driven by a rotatable eccentric assembly 112 having three eccentric elements 112a, 112b, and 112c disposed with 120° angular spacing on a motor shaft 110 to provide significantly improved NHV performance. The pumping elements 40a, 40b, 40c, 40d, 40e, and 40f may include a stepped-bore configuration, or may be a straight bore configuration, or may be either configuration piston pump elements.

Figure 8A:
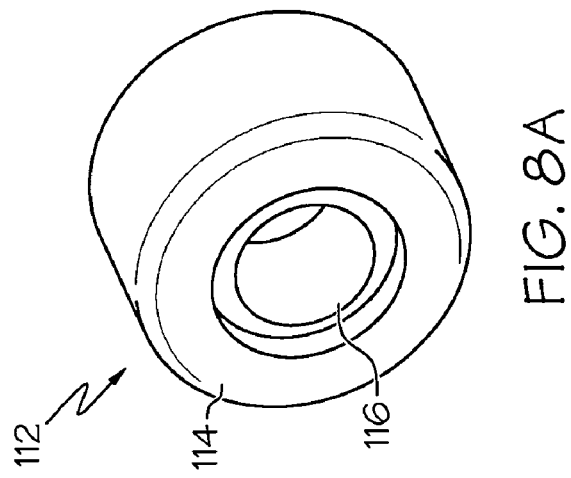
FIG. 8A is a perspective view of an eccentric needle bearing element shown in FIG. 8.
Figure 8:
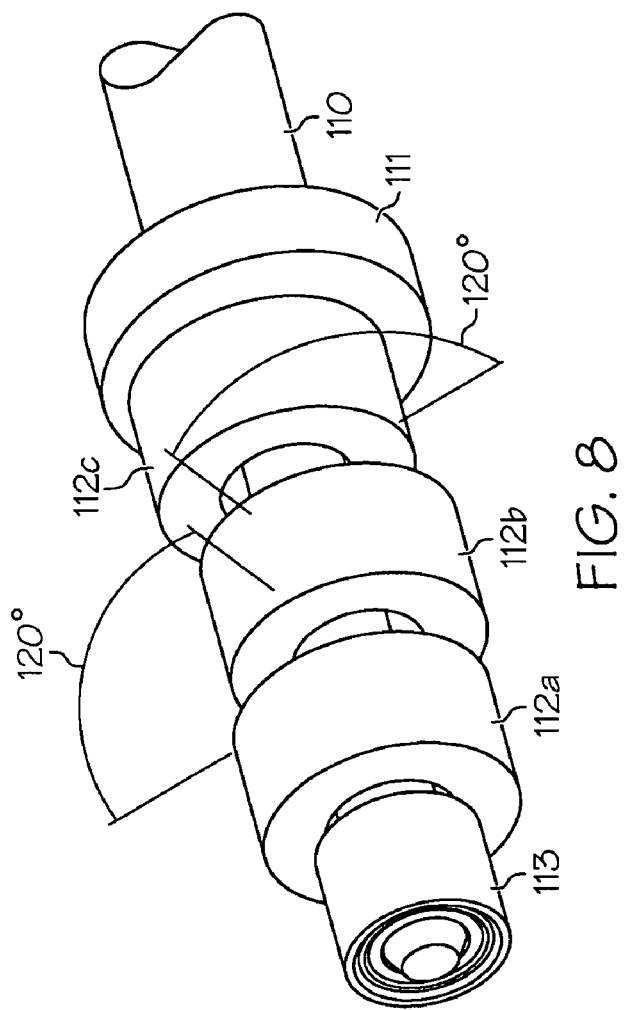
FIG. 8 is a front perspective view of a press-fit eccentric assembly for the device of FIG. 7.
Figure 8B:
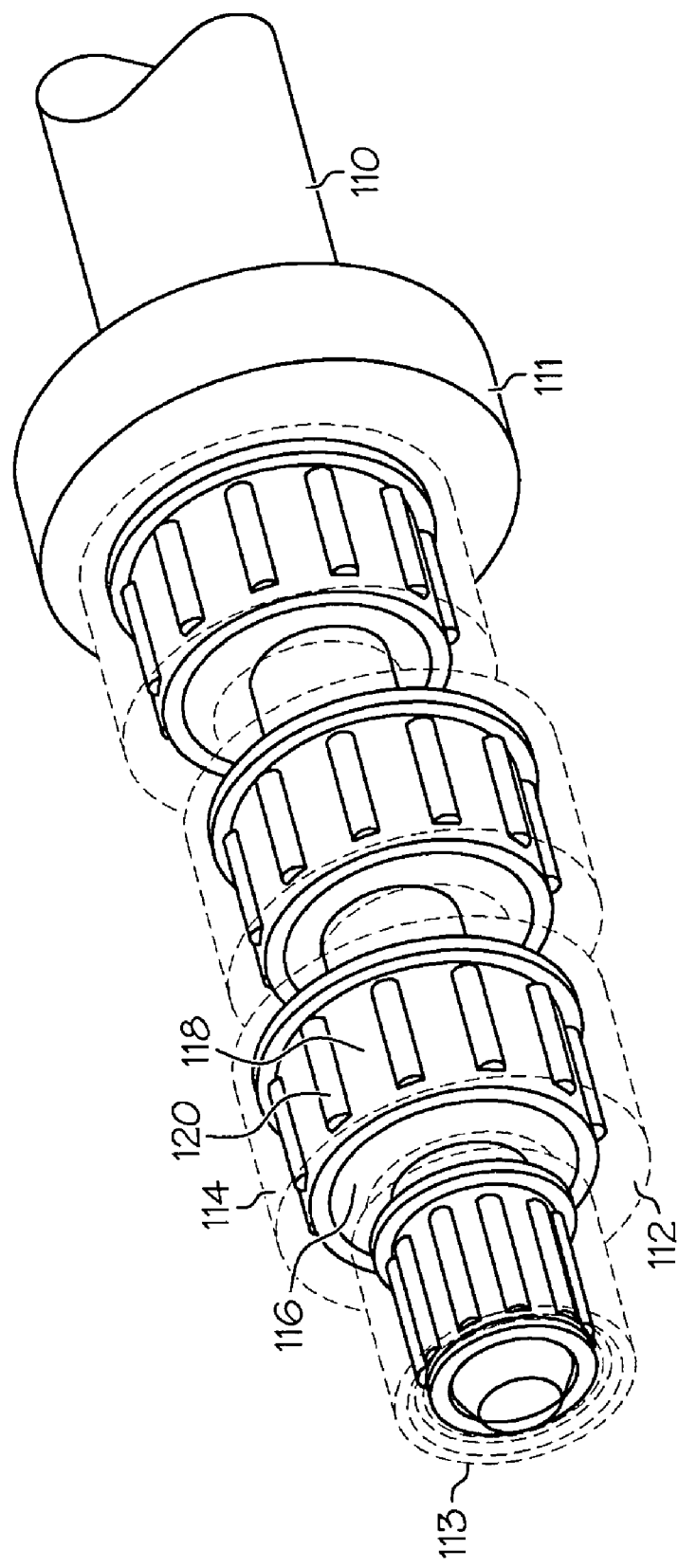
FIG. 8B is a cut-away perspective view of the rotatable eccentric assembly shown in FIG. 8.

FIG. 8 illustrates press-fit eccentric needle bearing elements 112a, 112b, and 112c, which are commercially available from suppliers such as INA Bearing Company. As shown in FIGS. 8A and 8B, each eccentric element 112a, 112b, 112c includes a solid outer ring 114, a rotatable inner ring 116, bearing cages 118 made from plastic or steel, and needle bearings 120 made from steel. The eccentric elements 112a, 112b, and 112c are press-fit onto the motor shaft 110 as illustrated in FIG. 8; but a wide variety of fastener designs may be utilized, such as but not limited to eccentric locking collar fasteners, grub screw fasteners in the inner ring, adapter sleeve fasteners, drive slot fasteners, or the like. Each outer ring 114 may have a crowned or non-crowned outside surface. It is believed that press-fit eccentric elements 112a, 112b, and 112c disposed with 120° angular spacing on a straight motor shaft 110 provide superior NHV performance because the assembly facilitates the pumping system shown in FIG. 7. Alternatively, the shaft may be constructed with more conventional ground-in eccentrics, but this alternative design may impose assembly and space restrictions and be more costly to manufacture.

Returning to FIG. 7, a first pair of pumping elements 40a and 40f may be disposed within a first pump bore 63a, a second pair of pumping elements 40b and 40e may be disposed within a second pump bore 63b, and a third pair of pumping elements 40c and 40d may be disposed within a third pump bore 63c. Each pump bore 63a, 63b, 63c is surrounded by a hydraulic block comprising a major portion of a hydraulic control unit body or "HCU" body 65. The pump layout further includes a piston driver in the form of a rotatable eccentric assembly 112 which is driven by the motor shaft 110 and used to drive a pair of opposed pistons 76 or 76' in their respective outer sleeves 68 as described earlier. The motor shaft 110 may be supported by at least one shaft bearing 111 in combination with at least one pilot bearing 113. The shaft bearing 111 and the pilot bearing 113 are received into journals which provide deflection resistance (i.e., the ability to maintain the theoretical longitudinal direction between the shaft bearing 111 and the pilot bearing 113) to the motor shaft 110, thereby improving pump efficiency. The pilot bearing 113 can be press-fit onto the outermost end of the motor shaft 110, and the rotatable eccentric assembly 112 inserted into a drive shaft bore 108 extending through the hydraulic block and intersecting the piston bores 63a, 63b, 63c. The horizontally opposed pairs of pumping elements may be offset by 180° such that when the piston 76 or 76' of one of the pumping elements (e.g., 40a) is in the bottom dead center position the piston 76 or 76' of the other pumping element (e.g., 40f) is in the top dead center position, although the pistons may be offset by various other degrees or may not be offset at all.

When non-aligned pumping elements (e.g., 40c and 40f) are fully positioned against their respective eccentric elements (e.g., 112a and 112c) radial forces are exerted from the pumping elements onto the eccentric bearings during their respective discharge strokes and tend to balance each other. For three pump units and eccentric elements having a 120° angular spacing, a third pumping element (e.g., 40e) may simultaneously exert radial forces onto the third eccentric element (e.g., 112b). Any unbalanced radial force resulting from the additive effects of these three radial forces may be offset by the journal/pilot bearing 113 in combination with the journal/shaft bearing 111, thereby avoiding or minimizing any deflection of the motor shaft 110.

Figure 13:
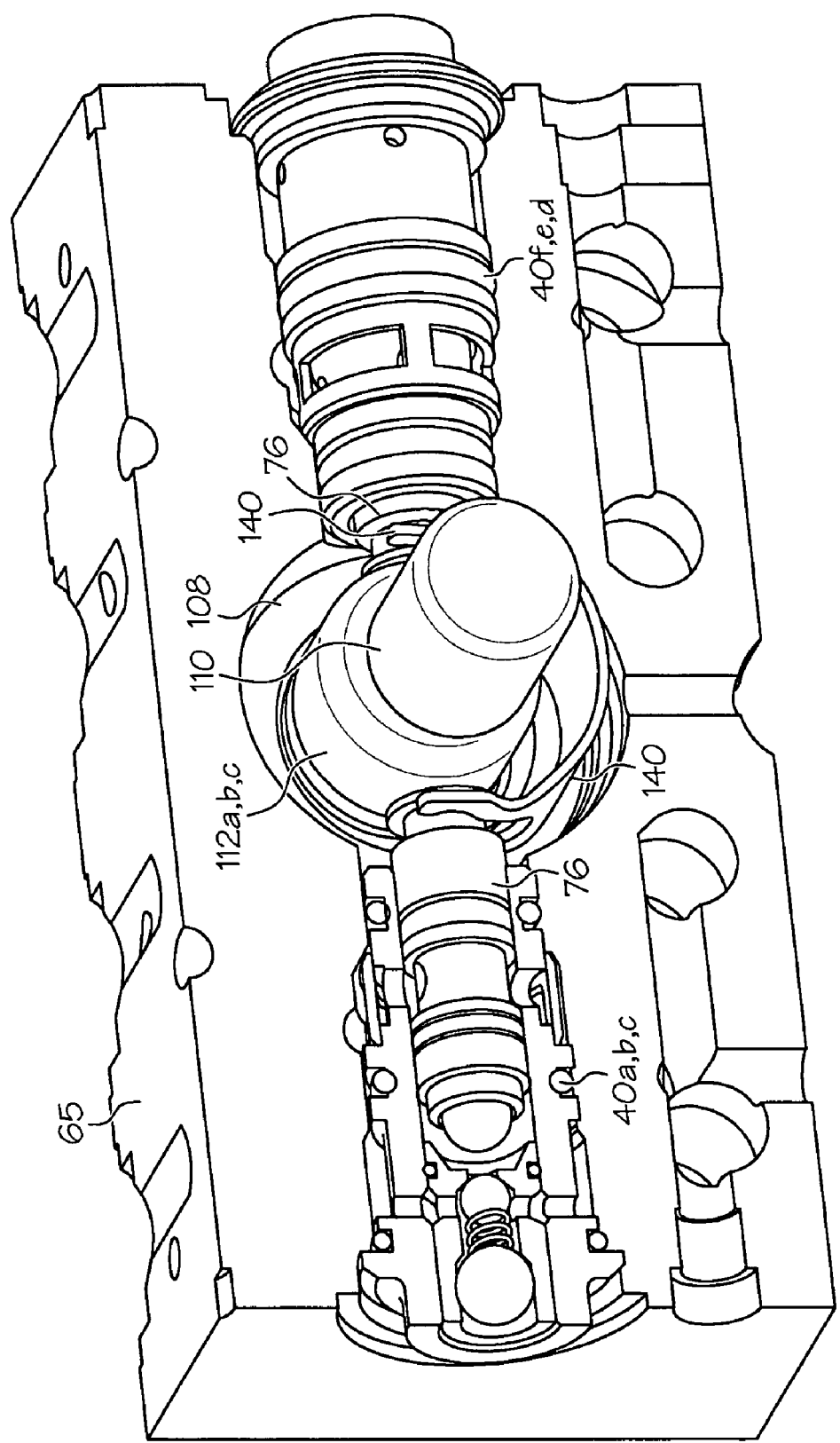
FIG. 13 is a cross section perspective view of an aspect of a brake pump assembly similar to that shown in FIG. 7, but having pumping elements coupled to a rotatable eccentric assembly by an external pump piston retainer.
Figure 14:
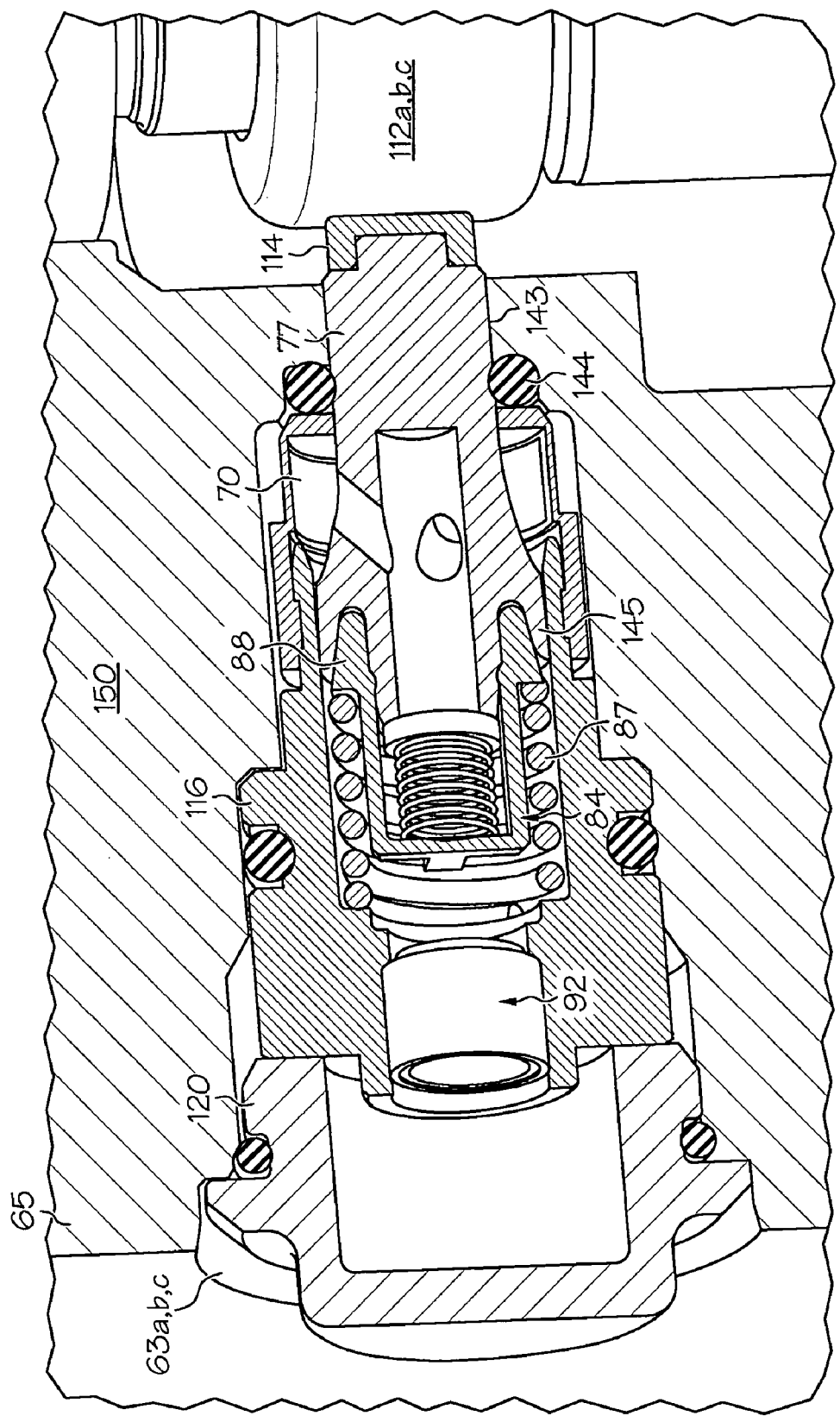
FIG. 14 is a cross section perspective view of the pumping element shown in FIG. 9 installed within a hydraulic block, illustrating pressure seals made of a polymeric material in combination with a "half-sleeve" pumping element design.
Figure 15:
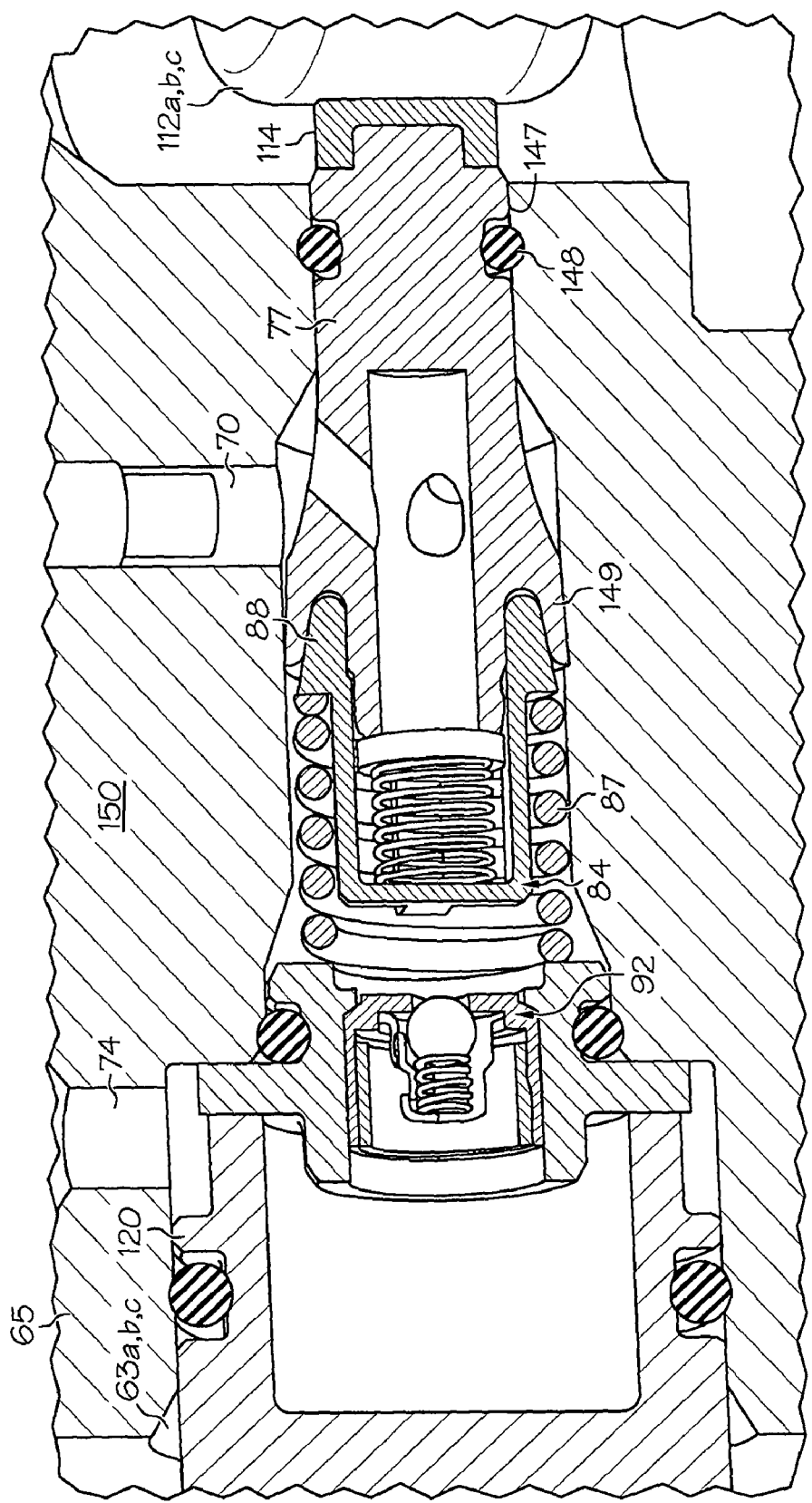
FIG. 15 is a cross section perspective view of the pumping element shown in FIG. 10 installed within a hydraulic block, illustrating pressure seals made of a polymeric material in combination with a sleeveless pumping element design.

A piston-biasing spring or piston return spring 87 may be located in each primary pump cavity 78 to force the distal end of the piston 76 or 76' to abut a rotating eccentric element 112a-c as shown in FIGS. 14 and 15. However providing a piston return spring 87 in a primary pump cavity 78 naturally displaces some brake fluid and reduces the pump efficiency. Therefore external pump piston retainers 140 as shown in FIG. 13 may be employed to improve pump efficiency. Such a retainer 140 may be located outside the pump cavity, adjacent to an eccentric element 112a-c and motor shaft 110 within the drive shaft bore 108, and be connected to the distal ends of a pair of horizontally opposed pistons 76 or 76'. The retainer 140 may be generally "C" shaped in end view and pulled into tension when fit around an eccentric element 112a-c. In this manner the retainer 140 forces the pistons 76 or 76' to abut the outer surface of the rotatable eccentric assembly 112 to ensure that rotating motion of the assembly 112 is translated into a reciprocating motion of the pistons. The pump efficiency can be higher with the retainers 140 as no brake fluid is displaced from the primary pump cavity 78 with the result that pump compression ratios are substantially improved. However, providing a retainer 140 fit around each eccentric element 112a-c may increase installation costs. Therefore, for certain aspects of the disclosure, internal return springs 87 may be used even though some pump performance robustness may be sacrificed.

In a conventional hydraulic pump, a piston made from a hard material (e.g., steel) that is inserted directly inside a piston bore made from a soft material (e.g., aluminum alloy) would cause severe erosion of the bore as the outer surface of the piston slides and rubs against its inner surface. Accordingly, a piston guide made from a very hard material may be inserted to shield the piston bore. For example, a piston sleeve 68 made from a hard material (i.e., a full sleeve design) as illustrated in FIGS. 2 and 3 could support a hard material piston 76 or 76', collectively designated 77, operating inside a piston bore 63*a*-*c*. A body 65 made from a soft material surrounds the sleeve 68. A body 65 constructed from a soft and light material, such as an aluminum alloy, may provide a significant benefit due to the highly desirable weight reduction when compared to a body 65 constructed from a material such as steel.

Figure 9:
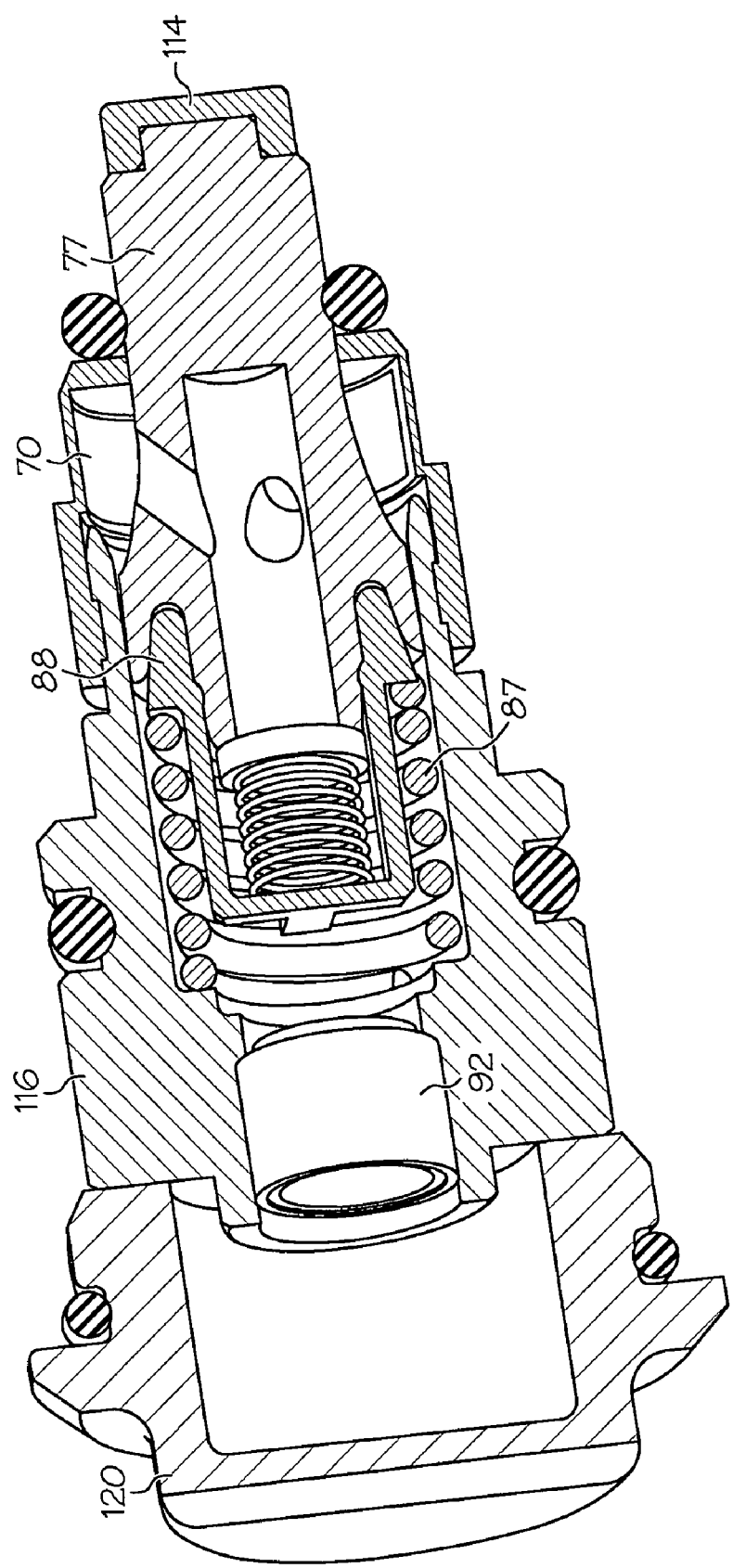
FIG. 9 is a cross section perspective view of a pumping element having a "half-sleeve" design with a polymer piston body.

As illustrated in FIG. 9, a pumping element 40*a*-*f* may instead have a partial sleeve 116 enabling improved flow through inlet 70 and an inlet filter, if provided. Cost reduction attributable to a partial sleeve 116, sometimes termed "half-sleeve," may be realized by eliminating the distal sleeve portion (i.e., in proximity to the inlet 70) and retaining the proximal sleeve portion of the full sleeve 68 shown in FIG. 3. With the half sleeve 116, O-rings may be used to seal to the surrounding body as shown, or alternatively, an interference fit or "press fit" may be used as shown in FIG. 7. The piston 77 may be a one-piece, high-heat, wear resistant polymer piston 77 including a small press-on steel cap 114 which functions as an eccentric wear surface. The half sleeve design is believed to be less expensive than designs incorporating a full sleeve 68, a separate external outlet check valve assembly, a steel piston or composite steel/plastic piston design, and/or a separate pump bore cap.

In one aspect of the disclosure, illustrated in FIG. 14, the pumping element 40*a*-*f* includes pistons 77 manufactured from a polymeric material in combination with a partial sleeve 116 (i.e., "half-sleeve" design) to protect a relatively soft housing cavity 150. FIG. 14 shows the pumping element shown in FIG. 9 installed within a housing cavity 150. A low-pressure seal 143 may be mounted around the circumference of the piston 77 on a distal portion of the piston 77 near the wear cap 114. It should be noted that, as illustrated in FIG. 14, an O-ring seal 144 may be used as the low-pressure seal 143 if desired, to facilitate the removability and inspection of the piston 77, but other elastomeric seals may be employed. A high-pressure seal 145 includes the interface surface between a circumference of the proximal portion of the piston 77 and the partial sleeve 116.

Figure 10:
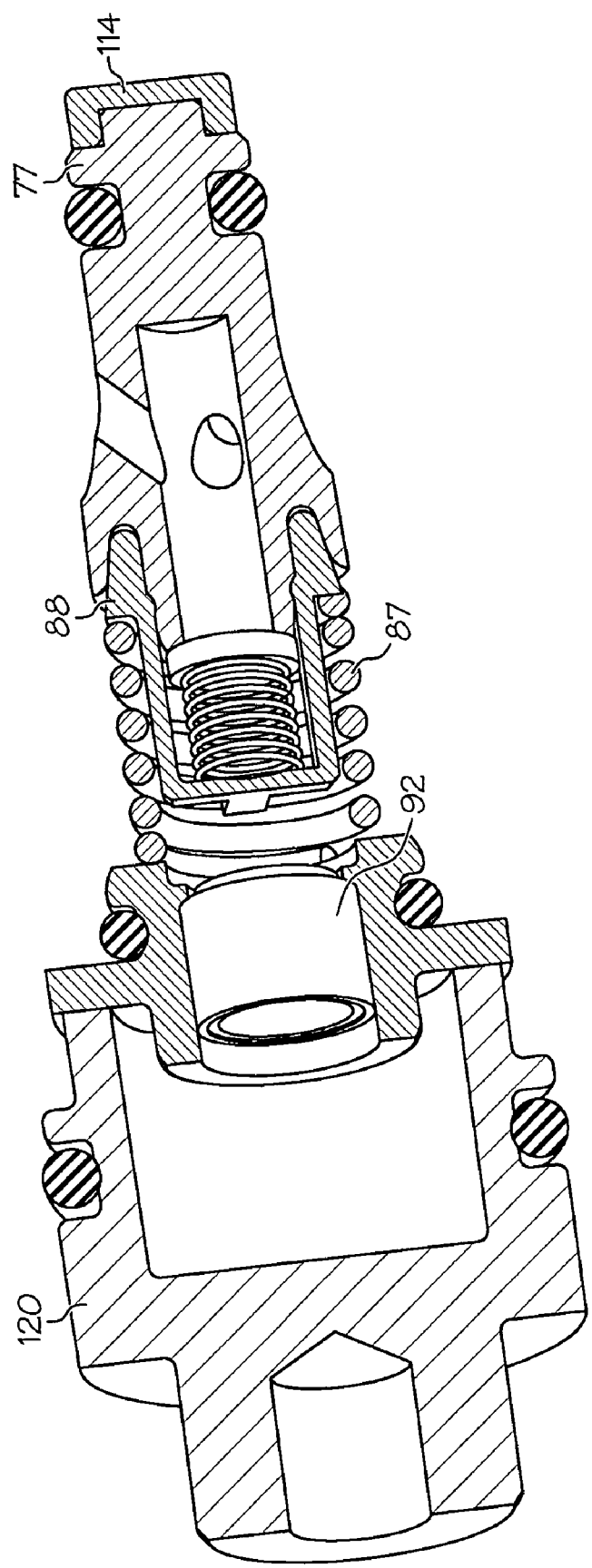
FIG. 10 is a cross section perspective view of a pumping element having a sleeveless design with a polymer piston body.

As illustrated in FIG. 10, a pumping element 40*a*-*f* may also instead have a sleeveless design incorporating a one-piece polymeric piston 77 with a press-on wear cap 114. The piston 77 may employ a stepped bore configuration or may be a straight bore configuration or may be either configuration and be used in the manufacture of a simplified, low cost brake pump assembly. A sleeveless design including a check valve housing 92, a pump bore cap 120, and a high-heat, wear resistant polymer piston 77 is believed to be less expensive than designs incorporating a separate external outlet check valve assembly, a steel piston or other composite steel/plastic piston designs, separate full sleeve or half-sleeve, and/or separate pump bore cap. The sleeveless design enables minimized bore-to-bore spacing (i.e., no piston sleeve is required) and minimized motor shaft length, thereby avoiding additional expense.

In one aspect of the disclosure, as illustrated in FIG. 15, a piston 77 manufactured from a softer, polymeric material (i.e., sleeveless design) may be used instead of a hard material piston sleeve (i.e., full sleeve or half-sleeve design) to protect a relatively soft housing cavity 150. FIG. 15 shows a pumping element having the design illustrated in FIG. 10 installed within a housing cavity 150. A low-pressure seal 147 may be mounted around the circumference of the piston 77 on a distal portion of the piston 77 near the wear cap 114. It should be noted that, as illustrated in FIG. 15, an O-ring seal 148 may be used as the low-pressure seal 147 if desired, but other elastomeric seals may be employed. A high-pressure seal 149 includes the interface surface between a circumference of the proximal portion of the piston 77 and the housing cavity 150. It should be noted the piston bore 63*a*-*c* requires a highly polished finish to facilitate the high-pressure seal 149 described above. The smooth surface finish required for the piston 77 may be obtained by using highly polished tooling during fabrication by injection molding.

A polymer piston may also be employed to simplify other aspects of brake pump assembly manufacturing. For example, during ABS control events brake fluid released into the accumulators 36 may flow to the pumping elements 40*a*-*f* under very high pressure, such as when braking hard on a dry tire/road interface. Such pressures in combination with the reciprocating motion of the pistons 77 may cause significant volumes of brake fluid to leak past the low-pressure seals 143 or 147 and into the drive shaft bore 108 of a brake pump assembly. If sufficient brake fluid were to build up within the drive shaft bore 108 then it might foul the motor 46 driving the brake pump assembly, causing a partial failure of the vehicle braking system. To prevent such failures brake pump assemblies typically include a drain line in fluid communication with the drive shaft bore, and may include a combination of sponges and/or seals disposed about the means for driving the pistons to isolate the motor from the rest of the assembly. However these fluid control elements increase the cost and part count of the brake pump assembly, as well as the complexity of the assembly sequence. To reduce the volume of leaked brake fluid to be controlled the pumping elements could be modified to include multiple low-pressure seals, but such designs become susceptible to a condition known as "hydraulic lock," where pressurized fluid trapped between multiple seals generates a resistance force that may immobilize a piston. In the aspects discussed above such a resistance force might exceed the return force generated by a piston return spring 87 or external pump piston retainer 140, cutting short or possibly eliminating a piston's suction stroke. A polymer piston 77 may instead provide a directional seal 81 that provides the benefit of multiple seals but is not susceptible to "hydraulic lock," thus permitting the simplification of, minimization of, or possible elimination of the drive shaft bore fluid control elements. It is believed that a polymer piston providing a directional seal reduces unit costs because the part count and complexity of the assembly sequence are reduced, particularly in multiple assembly devices such as the six element brake pump assembly discussed above.

Figure 16:
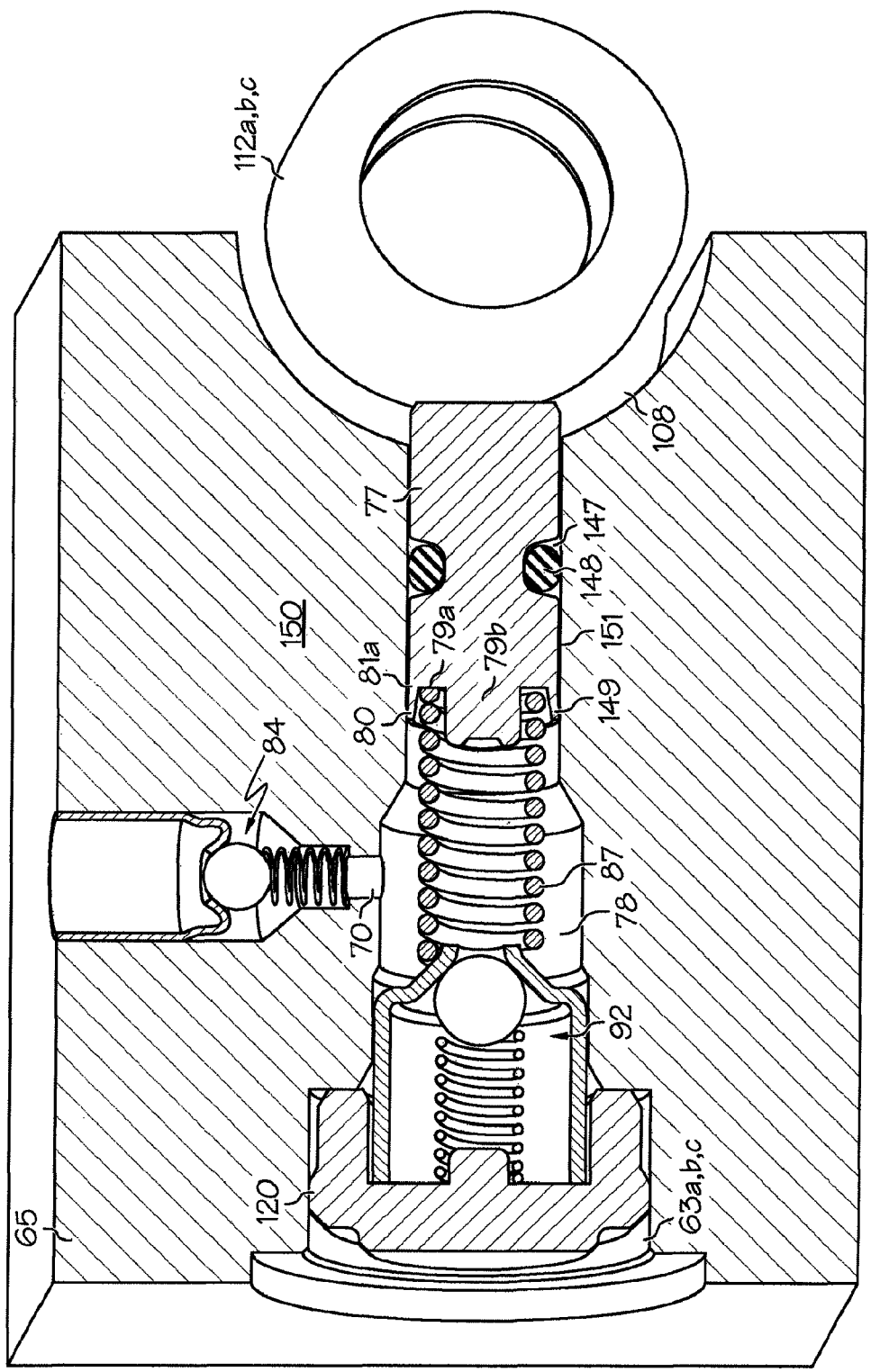
FIG. 16 is a cross section perspective view of a pumping element installed within a hydraulic block, illustrating a flexible, directional pressure seal provided as a high-pressure seal in a polymer piston element.

In one aspect of the disclosure, as illustrated in FIG. 16, a pumping element 40*a*-*f* may have a straight bore configuration incorporating a polymeric piston 77, and a portion of the polymeric piston 77 may serve as both a high-pressure seal 149 and a directional low-pressure seal to reduce leakage into the drive shaft bore 108. The piston 77 includes a peripheral sealing lip 81*a* surrounding the perimeter of the leading surface 80. The peripheral sealing lip 81*a* projects primarily longitudinally away from the leading surface 80 toward the pump cavity 78, and is molded, machined, or otherwise treated to project partially radially outward from the leading surface 80 toward the side walls of the housing cavity 150/pump bore 63*a*-*c*. The peripheral sealing lip 81*a* preferably projects outward from the side surface of the piston at an angle of about 5 degrees to about 10 degrees with respect to the longitudinal axis of the piston 77 prior to installation, and may have an average thickness of between about 0.1 mm and about 0.3 mm. The outward projection of the peripheral sealing lip 81a past the side surface of the piston 77 produces an interference fit with the housing cavity 150, but the outward angle of the lip, the thickness and profile of the lip, and the elasticity of the piston polymer material are preferably selected so that the peripheral sealing lip 81a may flex away from the side walls of the housing cavity 150 in response to a pressure differential of about 0.5 bars to about 2 bars between the distal and proximal sides of the seal. The longitudinal projection of the peripheral sealing lip 81a past the leading surface 80 permits the fluid pressure in the pump cavity 78 during a discharge stroke to reinforce the biased sealing engagement of the lip 81a against the side walls of the housing cavity 150, so that the high-pressure seal 149 in this aspect constitutes the interface surface between the peripheral sealing lip 81a and the housing cavity 150.

The leading surface 80 of the piston may optionally be contoured to define an annular channel 79a and projection 79b for receiving and centering a return spring 87. Preferably, a distal portion of the peripheral sealing lip 81a defines a portion of the annular channel 79a, and the lip 81a is trapezoidal such that the proximal end of the peripheral sealing lip 81a is spaced apart from the return spring 87 to be received in the channel 79a. Alternately, the leading surface of the piston may be substantially flat or configured to have any other desirable profile when an external pump piston retainer 140 is employed. The distal end of the piston 77 may also optionally include a wear cap 114 (not shown), or be configured to engage an external pump piston retainer 140 in manners similar to that illustrated in FIG. 7 (also not shown).

A low-pressure seal 147 is mounted around the circumference of the piston 77 behind the high-pressure seal 149. An O-ring seal 148 may be used as the low-pressure seal 147, if desired, to facilitate the removability and inspection of the piston 77, but other elastomeric seals may be employed in its stead. The side surface of the piston 77 and the side walls of the housing cavity 150 between the low-pressure seal 147 and the high-pressure seal 149 define a nominally closed clearance gap 151, such as that which would be found in a solid piston having multiple O-ring seals. The low-pressure seal 147 is preferably mounted over a medial portion of the piston 77 so that it does not encounter the bearing wear path of the piston, which in the illustrated aspect would constitute that portion of the housing cavity 150 engaged by the peripheral sealing lip 81a as well as that portion of the housing cavity 150 engaged by the distal end of the piston 77. Most means for driving the piston 77, such as the rotatable eccentric assembly 112 described above, will exert a lateral force against it, causing the piston 77 to cant about the low-pressure seal 147 so that a portion of the distal end and an opposite portion of the leading surface 80/peripheral sealing lip 81a bear against the side walls of the housing cavity 150. Any debris that migrates between the piston 77 and the side walls of the housing cavity 150 may be dragged across these bearing surfaces and eventually deposited at the ends of the wear path(s). If the typically very soft low-pressure seal 147 should reciprocate over the accumulated debris or a scored side wall surface it will tend wear comparatively quickly, and potentially cause an excessive leakage of brake fluid into the drive shaft bore 108 of the device. By positioning the low-pressure seal 147 over a medial portion of the piston 77, between the bearing wear paths, wear due to abrasion can be minimized and the durability of the pumping element 40a-f can be either maintained or increased.

In comparison to the pistons 77 shown in FIGS. 9 and 10, the piston of this aspect includes a peripheral sealing lip 81a that acts as both a high-pressure seal 149 and an additional, directional seal to resist leakage into the drive shaft bore 108 during a pump suction stroke. The peripheral sealing lip 81a is directional in that it may selectively disengage from the side walls of the housing cavity 150 during a pump suction stroke in response to an accumulation of pressurized brake fluid behind the distal side of the seal, thereby preventing a build up of pressure sufficient to cause a hydraulic lock condition. Since both the high-pressure seal 149/directional seal 81a and low-pressure seal 147 are intended to act in concert during a pump suction stroke, the exemplary piston 77 does not include a central bore 82, the pumping element inlet 70 is instead positioned ahead of the leading surface 80 of the piston 77 at top dead center position, and the inlet check valve 84 is instead mounted within or in fluid communication with the inlet 70.

During operation of the pumping element 40a-f the piston 77 may commence pumping operations when the piston 77 is at bottom dead center position. Peripheral sealing lip 81a is biased into sealing engagement with the side walls of the housing cavity 150 to provide a high-pressure seal 149 in the pumping element. As the piston 77 is driven toward top dead center position, brake fluid is compressed within the pump cavity 78 and the increased pressure opens the outlet check valve 92, pushing the fluid through the check valve and outlet 74 (not shown) for use in the brake system 10. The increased pressure also creates a negative pressure differential between the clearance gap 151 and pump cavity 78, causing the brake fluid in the pump cavity 78 to further press the peripheral sealing lip 81a into sealing engagement with the side walls of the housing cavity 150. The increased pressure in combination with the motion of the piston 77 may still cause some brake fluid to migrate past the high-pressure seal 149 and accumulate within the clearance gap 151, however the directional nature of the seal will prevent a hydraulic lock condition, as discussed below.

When the piston reaches top dead center position and begins to be driven toward bottom dead center position, pressure within the pump cavity 78 decreases to produce a relative suction, and brake fluid in the accumulator 36 may be driven into or drawn into the pump cavity 78 through the inlet 70. If pressurized brake fluid has built up within the clearance gap 151 and there is a positive pressure differential between it and the brake fluid within the pump cavity 78, i.e., brake fluid in the clearance gap 151 has developed a greater pressure than the brake fluid entering the pumping element, then the peripheral sealing lip 81a may flex away from the side walls of the housing cavity 150 to depressurize the fluid within the clearance gap 151, causing the pressure within the clearance gap to approximate the inlet fluid pressure. On the other hand, if there is no significant pressure differential or a negative pressure differential then the peripheral sealing lip 81a will remain in sealing engagement with the side walls of the housing cavity 150 to both maintain that differential and to serve as an additional seal against leakage into the drive shaft bore 108.

Those skilled in the art will recognize that the pressure of the brake fluid within the clearance gap 151 will initially be lower than the pressure of any brake fluid driven from an accumulator 36 during a controlled braking event, and only slowly build towards higher pressures during the course of the event. Advantageously, the pressure of the brake fluid within the clearance gap 151 may be reduced to a baseline level by simply manipulating the brake system valves and running the brake pump assembly 40 for a short time after the conclusion of a controlled braking event. The peripheral sealing lip 81a permits the fluid pressures within the clearance gap 151 to be moderated to reduce leakage through the low-pressure seal 149 while eliminating the potential for entrapping fluid pressurized to such an extent as to cause a hydraulic lock condition.

Figure 17:
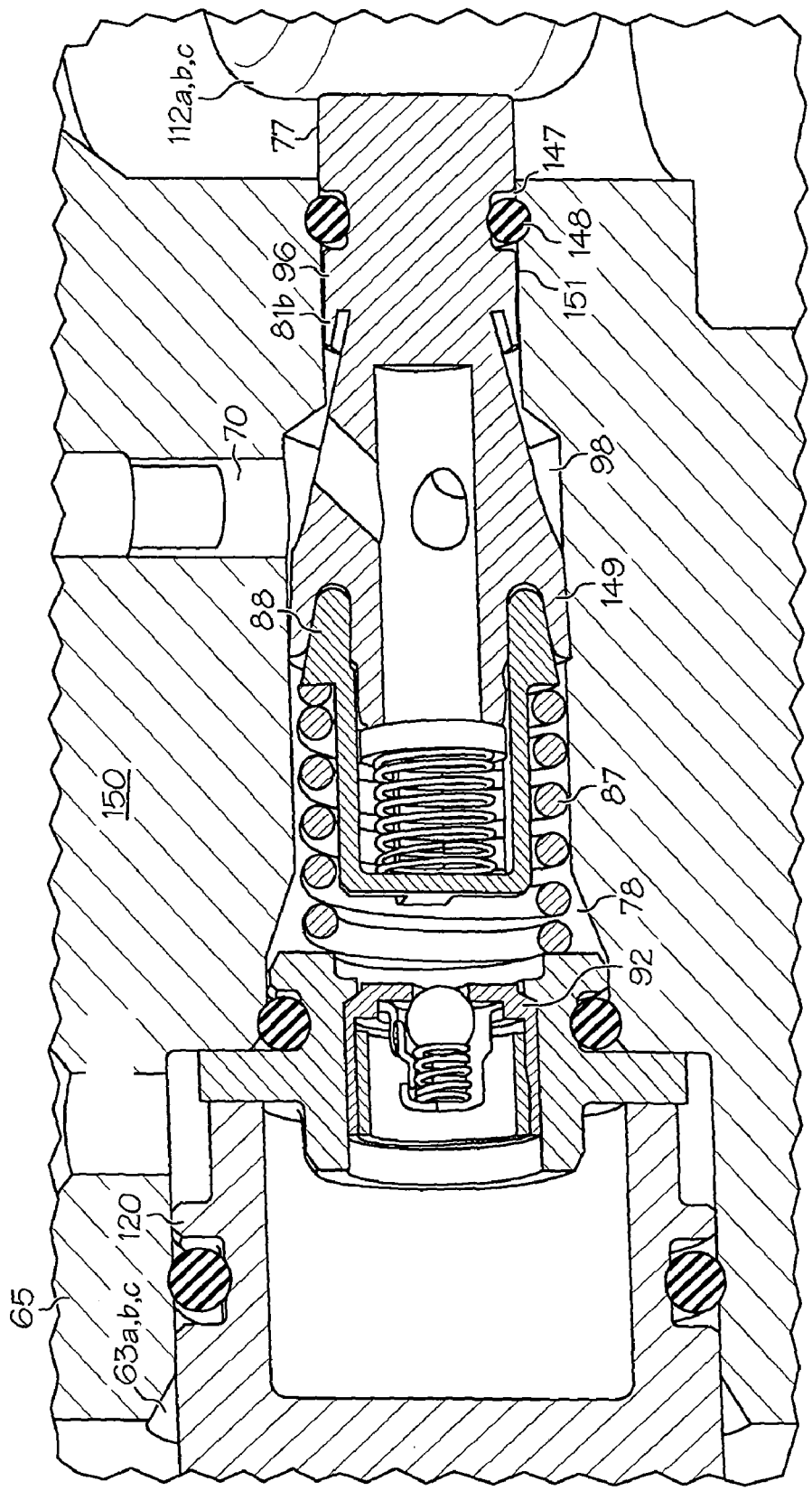
FIG. 17 is a cross section perspective view of a pumping element similar to that shown in FIG. 10 installed within a hydraulic block, illustrating a flexible, directional pressure seal provided as an additional low-pressure seal in a polymer piston element.

In another aspect of the disclosure, as illustrated in FIG. 17, a pumping element 40a-f may have a stepped-bore configuration incorporating a polymeric piston 77 having a high pressure seal 149 and a separate directional low-pressure seal to reduce leakage into the drive shaft bore 108. The directional low-pressure seal is preferably provided in addition to an elastomeric low-pressure seal, such as an O-ring seal, because it is believed that the latter seal is better able to resist "static leakage" when the brake pump assembly is idle. However an elastomeric low-pressure seal is not a necessary element of the device, which could, for example, include a plurality of directional low-pressure seals.

In an exemplary piston 77 similar to that shown in FIG. 15 and discussed earlier, the high-pressure seal 149 includes the interface surface between a circumference of the proximal portion of the piston 77 and the housing cavity 150, and a low-pressure seal 147 is mounted around the circumference of the piston 77 on a medial portion adjacent the eccentric-engaging end. An O-ring seal 148 may be used as the low-pressure seal 147 if desired, but other elastomeric seals may be employed in its stead.

The piston 77 includes a peripheral sealing lip 81b surrounding a perimeter of the trailing neck portion 96 proximal to the low-pressure seal 147. The peripheral sealing lip 81b projects primarily longitudinally toward the secondary pump cavity 98 of the pumping assembly 40a-f, and is molded, machined, or otherwise treated to project partially radially outward from the trailing neck portion 96 toward the side walls of the housing cavity 150/pump bore 63a-c. The peripheral sealing lip 81b preferably projects outward from the side surface of the trailing neck portion 96 at an angle of about 5 degrees to about 10 degrees with respect to the longitudinal axis of the piston 77 prior to installation, and may have an average thickness of between about 0.1 mm and about 0.3 mm. The outward projection of the peripheral sealing lip 81b past the trailing neck portion 96 of the piston 77 produces an interference fit with the housing cavity 150 behind the secondary pump cavity 98, providing an additional low-pressure seal. The side surface of the trailing neck portion 96 and the side walls of the housing cavity 150 between the low-pressure seal 147 and the peripheral sealing lip 81b define a nominally closed clearance gap 151, such as that which would be found in a piston having stacked O-ring seals, but the outward angle of the lip, the thickness and profile of the lip, and the elasticity of the piston polymer material are preferably selected so that the peripheral sealing lip 81b may flex away from the side walls of the housing cavity 150 in response to a pressure differential of about ? bars to about ? bars between the distal and proximal sides of the seal. The longitudinal projection of the sealing lip 81b past the trailing neck portion 96 produces a seal that may be further pressed against the side walls of the housing cavity 150 by pressurized fluid in the secondary pump cavity 98, but flexed away from the side walls of the housing cavity 150 as the piston 77 reciprocates to depressurize the fluid within the clearance gap 151.

During operation of the pumping element 40a-f, the piston 77 may commence pumping operations when the piston 77 is at top dead center position. Peripheral sealing lip 81b is biased into sealing engagement with the side walls of the housing cavity 150 to provide an additional low pressure seal in the pumping element. As the piston 77 is driven toward bottom dead center position, the primary pump cavity 78 grows larger and creates a suction force while simultaneously the secondary pump cavity 98 grows smaller and creates a temporary positive pressure so as to prime the primary pump cavity 78. When the piston 77 reaches the end of its cycle, reverses, and is driven toward top dead center position, the primary pump cavity 78 grows smaller and pushes pressurized fluid through the outlet check valve 92 and outlet 74 while simultaneously the secondary pump cavity 98 grows larger and draws fluid into the secondary pump cavity 98 via the inlet 70. During either motion, brake fluid released into the accumulators 36 during a controlled braking event may flow into the secondary pump cavity 98 under very high pressure, potentially subjecting the low-pressure seals to pressures sufficient to create a hydraulic lock condition between stacked O-ring type seals. However, if pressurized brake fluid has built up within the clearance gap 151 and there is a positive pressure differential between it and the brake fluid within the secondary pump cavity 98 then the peripheral sealing lip 81a may flex away from the side walls of the housing cavity 150 to depressurize the fluid within the clearance gap 151, causing the pressure within the clearance gap to approximate the inlet fluid pressure. On the other hand, if there is no significant pressure differential or a negative pressure differential then the peripheral sealing lip 81b will remain in sealing engagement with the side walls of the housing cavity 150 to both maintain that differential and to serve as an additional seal against leakage into the drive shaft bore 108.

Those skilled in the art will recognize that the pressure of the brake fluid within the clearance gap 151 will generally be lower than the pressure of any brake fluid driven from an accumulator 36 during a controlled braking event, and only slowly build towards higher pressures during the course of the event. Preferably, the outward angle of the lip, the thickness and profile of the lip, and the elasticity of the piston polymer material are selected so that the peripheral sealing lip 81b does not flex away from the side walls of the housing cavity 150 in response to the pressure differential between a typical suction state pressure and the positive priming pressure temporarily created in the secondary pumping cavity 98 so as to prevent premature wear and/or fatigue of the peripheral sealing lip feature.

High-heat, wear resistant engineering thermoplastics may be used to replace traditional metal parts in many of the components disclosed herein to reduce weight and cost per part. These polymers may be injection molded to form a wide variety of parts, such as but not limited to gears, bearings, pistons and other brake pump assembly components. Representative examples of high-heat, wear-resistant polymers which may be used include but are not limited to polyimide (manufactured under the trademark KAPTON® by the DuPont Company), polyetherimide (manufactured under the trademark ULTEM® by the General Electric Company), polyether ether ketone (manufactured under the trademark PEEK™ by Victrex PLC), and the like. More particularly the polymeric pistons 77 described herein can be made of fully or partially of these polymers. These polymeric materials are lighter and have greater wear resistance and temperature resistance than many steel-based metals, which translates into a longer piston service life, as well as less fuel consumption by the vehicle during the service life of the polymeric piston 77.

In additional aspects of this disclosure, polyether ether ketone may be used to produce brake pump assemblies having lower unit costs without significantly detracting from performance and durability standards or NHV performance. PEEK™ is a semicrystalline material, which retains its mechanical properties even at very high temperatures. Unfilled PEEK™ may be characterized by one or more of the following properties: a melting point of between about 340° C. and about 350° C.; a density of about 1.3 gram/cm³; water absorption of less than about 0.5 weight percent; and tensile strength of about 14,500 psi (at 23° C.) and about 1,740 psi (at 250° C.). Furthermore, PEEK™ has a low coefficient of friction and resists attack by a wide range of organic and inorganic chemicals, such as but not limited to brake fluid. PEEK™ polymer is commonly mixed with other resins or fillers such as glass or carbon. As properties vary with filler type and content, compounds can be formulated to meet specific end-use requirements.

Figure 11:
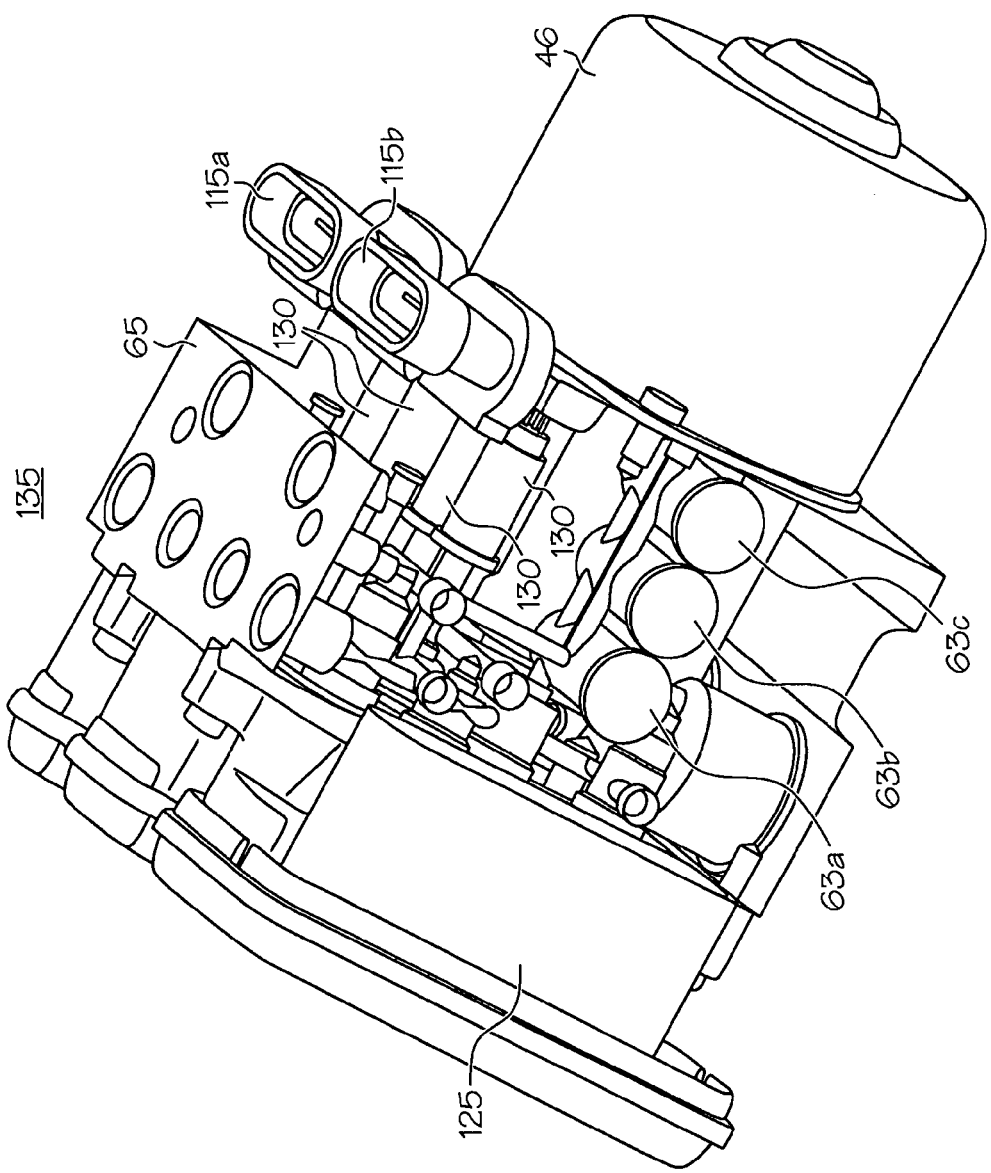
FIG. 11 is cut-away perspective view of an electro-hydraulic control unit or "EHCU" having an embedded wheel pressure sensor.
Figure 12A:
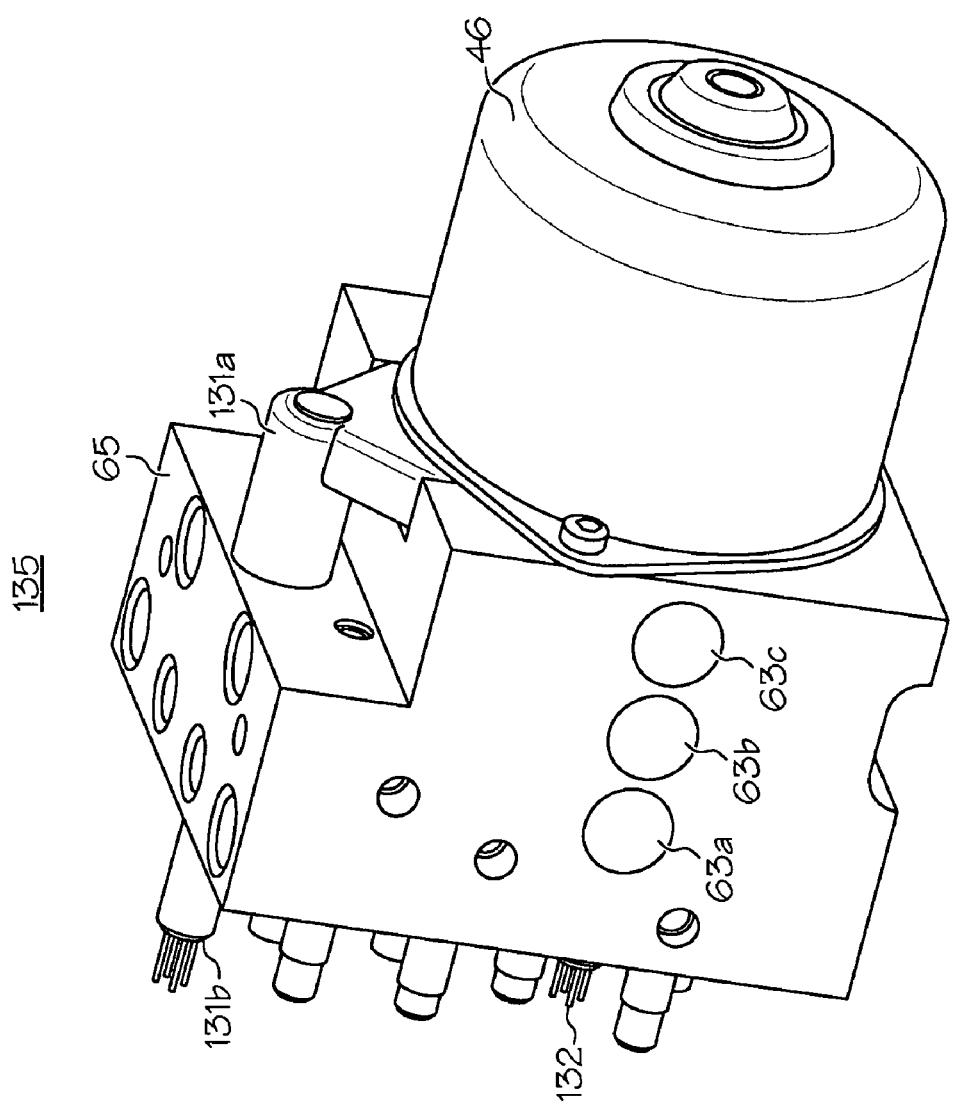
FIG. 12A is a perspective view of an EHCU having an embedded wheel pressure sensor and sensor signal path, with the electronic control unit portion omitted.
Figure 12B:
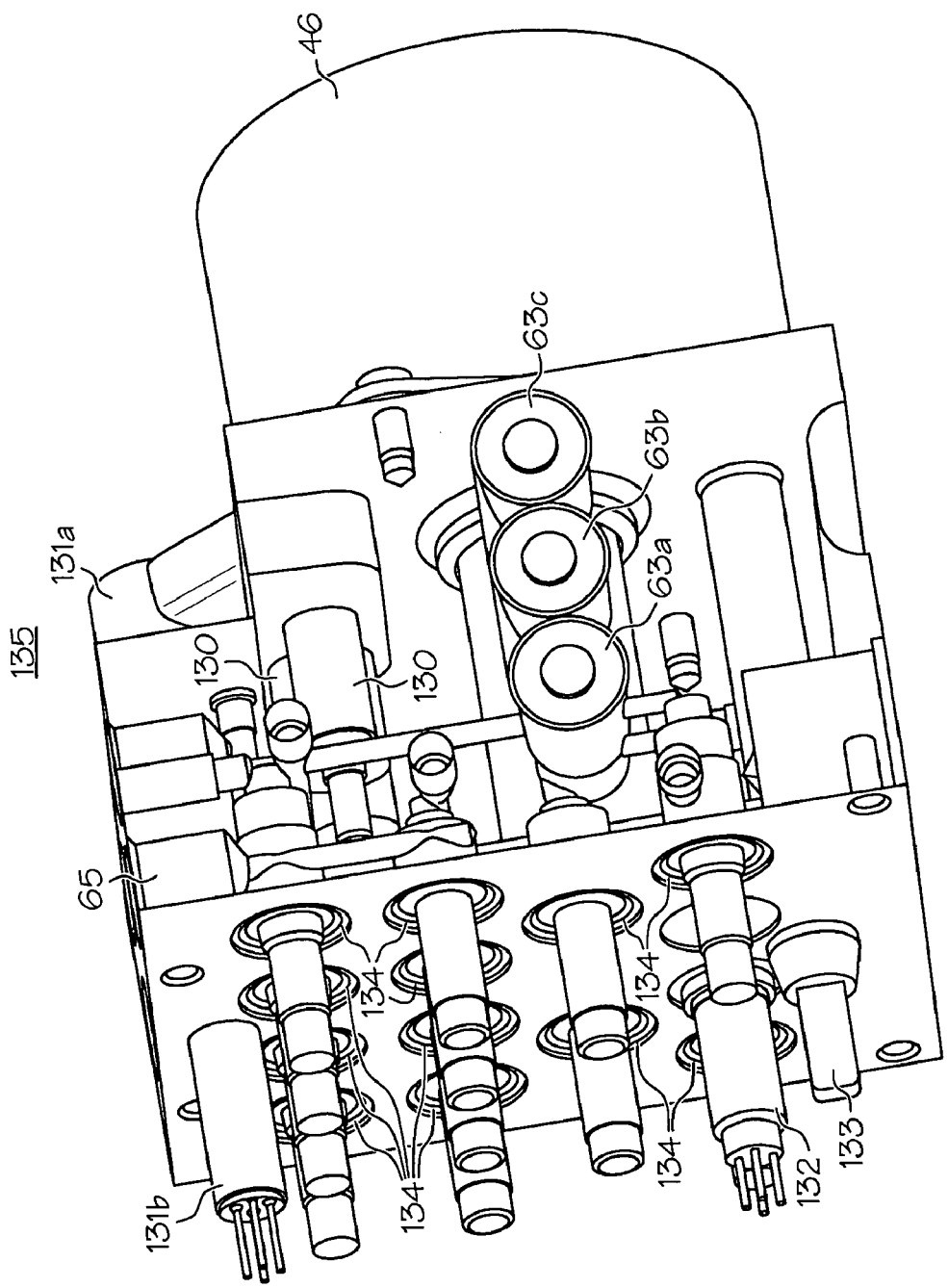
FIG. 12B is a cut-away perspective view of the EHCU of FIG. 12A showing an interface between a hydraulic control unit portion and an electronic control unit portion.

In accordance with other aspects of the disclosure, as illustrated in FIGS. 11 and 12A-B, the HCU body 65 may be incorporated within or formed as part of an EHCU packaging design, generally designated 135. Furthermore, the EHCU 135 may be adapted to include an embedded wheel brake subsystem pressure sensor 130 (see FIGS. 11 and 12B) which senses brake fluid pressure in one or more of the wheel brake subsystems 31. Such an embedded sensor eliminates additional installation steps as well as most external sensor wiring, and the pressure information provided by the pressure sensor 130 may be required by the ECU 135 to perform the various brake system control tasks described above. Thus, a braking system 10 is disclosed which, compared to prior art braking devices, incorporates an embedded wheel brake subsystem pressure sensor 130 without departing from an objective of achieving a compact type of construction and low manufacturing cost. An important aspect in this respect is the constructive extension of the functionality of an already existing highly integrated control mechanism, EHCU 135, by exploiting a small mounting space available within the HCU body 65.

The EHCU 135 includes a pump motor 46, an ECU 125, and an HCU body 65 disposed between the pump motor 46 and the ECU 125. The HCU body 65 may include the elements schematically shown in FIG. 1, excluding wheel brake subsystems 31, sensors 50, 55, 56, 57, 58, 59, 60, ECU 62, and the master cylinder/reservoir 12, 14, and having the hydraulic and mechanical configuration shown in FIGS. 5 and 7. As described earlier, the HCU may thus contain pumping elements 40a and 40f; or 40a, 40b, 40e, and 40f; or 40a, 40b, 40c, 40d, 40e, and 40f, etc. arranged in a horizontally opposed (i.e., boxer-style) configuration. The ECU 125 comprises the overall electronic system (not shown) of the EHCU 135, such as electromagnetic coils for actuating valves, electrical contacts, power semiconductors, microcontrollers, and the like, which are generally provided on a single circuit board. Current vehicle assembly regulations may require the ECU 125 to be separable from the HCU body 65 for servicing purposes, and reconnectable to the HCU body 65 thereafter. Thus, each apply valve 24, release valve 26, isolation valve 25, and prime valve 21 is preferably formed as a solenoid valve 134 switchable between open and closed positions by a solenoid coil subassembly (not shown). The plurality of solenoid valves 134 are preferably exposed at the interface between the HCU body 65 and the ECU 125, and nest into integral female connectors (not shown) on the ECU 125. Also, a motor connector plug 133 may be provided to facilitate electrical communication between the ECU 125 and the motor 46, and nest into a socket connector (not shown) in the ECU 125.

Pressure sensors 61 shown in FIG. 1 may comprise wheel braking subsystem pressure sensor(s) 130 and master cylinder pressure sensor 132. Wheel braking subsystem pressure sensor(s) 130 typically cannot be mounted like master cylinder pressure sensor 132 because they must sample fluid pressure downstream from an apply valve 24, in a region of the EHCU where hydraulic and mechanical components are optimally provided in an extremely dense packaging such as that shown in FIGS. 11 and 12B. However, an advantage of embedding a pressure sensor 130 within the HCU body 65 is that the pressure sensor 130 is protected against environmental influences to a much better degree than a sensor 61 that is arranged externally. The pressure sensor(s) 130 as shown in the present figures advantageously may exploit a small mounting space available within the HCU body 65, wherein the sensor(s) 130 are embedded in the HCU body 65 and located adjacent to but vertically separated from the horizontally opposed pumping elements 40a-f. Such a space is evident in the cut-away view of a horizontally opposed hydraulic block configuration shown in FIG. 5, but essentially absent in the cut-away view of a radial-style hydraulic block configuration shown in FIG. 6. As illustrated in the cut-away section of FIG. 11, the pressure sensor 130 has two ends, with a hydraulic sampling end containing a pressure transducer oriented toward valves 134 and ECU 125, and a signal end including a plurality of electrical pins typically oriented toward the motor unit 46. The electrical pins may provide an external electrical connection for communication via connection ports 115a and 115b and an external harness device (not shown) in direct or indirect electrical communication with the ECU 125. The harness may take a variety of forms, such as but not limited to a portion of a vehicle wiring harness, a separate jumper harness, etc.

Alternately, as illustrated in FIG. 12, connection ports 115a and 115b may be omitted, and the electrical pins may instead be operatively connected to a lead frame 131a and connector plug 131b. The lead frame 131a and connector plug 131b advantageously may further exploit a small space available within the HCU body 65, wherein the connector plug portion 131b is substantially embedded within the HCU body 65 and extending parallel to, but vertically separated from, the longitudinal axis of the rotatable eccentric assembly 112, in a volume which is unlikely to be occupied by any hydraulic and/or mechanical portions of the brake pump assembly. Such a space is evident along the vertical centerline of the cut-away view shown in FIG. 5. The lead frame 131a may be received or receive a connector on the HCU body 65, and operatively connected to the electrical pins of the pressure sensor(s) 130. The connector plug 131b may be slideably received within HCU body 65, extending therethrough to ECU 125 to provide a substantially or wholly embedded signal path between pressure sensor(s) 130 and the electronic system of ECU 125.

Having described the disclosure in detail and by reference to specific aspects thereof, it will be apparent that modifications and variations are possible without departing from the spirit and scope of the disclosure as defined by the following claims.

What is claimed is:

1. A brake pump assembly for pressurizing a fluid comprising:
   a block defining a piston bore,
   a piston slidably disposed in said piston bore including a trailing neck portion and defining a primary pump cavity on one side of said piston,
   a low pressure seal disposed between said piston and said piston bore, a first sealing lip integral with and projecting longitudinally from said piston toward said primary pump cavity and spaced from said low pressure seal and sealed to said piston bore to define a secondary pump cavity between said trailing neck portion and said first sealing lip and for flexing radially inwardly in response to a positive pressure differential between the fluid in said secondary pump cavity and the fluid in said primary pump cavity to allow fluid to flow from said secondary pump cavity to said primary pump cavity, said first sealing lip extending radially outwardly from said piston for biasing said sealing lip radially toward said piston bore in response to a negative pressure difference between the fluid in said secondary pump cavity and the fluid in said primary pump cavity, and a second sealing lip integral with and projecting longitudinally from said trailing neck portion of said piston toward said secondary pump cavity wherein said second sealing lip extends radially outwardly from said trailing neck portion of said piston for sealing engagement with said piston bore.

2. The brake pump assembly of claim 1, wherein said first sealing lip engaging said piston bore forms a high-pressure seal to restrict fluid from flowing from said primary pump cavity into said secondary pump cavity.

3. The brake pump assembly of claim 2, wherein said first sealing lip projects primarily longitudinally away from said second sealing lip for sealing engagement with said piston bore.

4. The brake pump assembly of claim 3 wherein said piston extends along a longitudinal axis, said piston has a generally cylindrical side surface, and said first sealing lip projects radially outward from said side surface at an angle of between 5 degrees and 10 degrees from the longitudinal axis of said piston prior to insertion within said piston bore.

5. The brake pump assembly of claim 3 wherein said first sealing lip is configured to flex inwardly to allow fluid to flow from said secondary pump cavity to said primary pump cavity only in response to a positive pressure differential of 0.5 to and 2.0 bars between the fluid in said secondary pump cavity and the fluid in said primary pump cavity.

6. The brake pump assembly of claim 3 wherein said low pressure seal is mounted around the circumference of said trailing neck portion of said piston.

7. The brake pump assembly of claim 1, wherein said piston extends along a longitudinal axis, said trailing neck portion has a generally cylindrical side surface, and said leading surface projects radially outward from said side surface at an angle of between 5 degrees and 10 degrees from the longitudinal axis of said piston prior to insertion within said piston bore.

8. The brake pump assembly of claim 1, wherein:
said trailing neck portion of said piston defines a narrowed medial portion; and
said low-pressure seal is a non-directional seal mounted around said medial portion such that said non-directional seal will not encounter a bearing wear path of said piston during normal reciprocating operation of said piston.

9. The brake pump assembly of claim 1 wherein said piston is formed of a polymeric material.

10. The brake pump assembly of claim 9, wherein said polymeric material is chosen from the group consisting of polyimide, polyetherimide and polyether ether ketone.

11. The brake pump assembly of claim 10, wherein a distal end of said piston includes a press-on steel wear cap.

* * * * *

UNITED STATES PATENT AND TRADEMARK OFFICE
CERTIFICATE OF CORRECTION

| | | |
|---|---|---|
| PATENT NO. | : 8,011,289 B2 | Page 1 of 1 |
| APPLICATION NO. | : 11/895551 | |
| DATED | : September 6, 2011 | |
| INVENTOR(S) | : Brian F. Waller and Bruce Allen Bryson | |

It is certified that error appears in the above-identified patent and that said Letters Patent is hereby corrected as shown below:

Column 13, Line 27: "adjacent the eccentric" should read -- adjacent the terminal eccentric --.

Signed and Sealed this
Thirteenth Day of March, 2012

David J. Kappos
*Director of the United States Patent and Trademark Office*